(12) United States Patent
Ma et al.

(10) Patent No.: US 9,083,740 B1
(45) Date of Patent: Jul. 14, 2015

(54) NETWORK TRAFFIC PATTERN MATCHING USING ADAPTIVE DETERMINISTIC FINITE AUTOMATA

(75) Inventors: Qingming Ma, Santa Clara, CA (US); Bryan Burns, Portland, OR (US); Krishna Narayanaswamy, San Jose, CA (US); Li Zheng, Beijing (CN)

(73) Assignee: Juniper Networks, Inc., Sunnyvale, CA (US)

( * ) Notice: Subject to any disclaimer, the term of this patent is extended or adjusted under 35 U.S.C. 154(b) by 867 days.

(21) Appl. No.: 12/568,319

(22) Filed: Sep. 28, 2009

(51) Int. Cl.
*H04L 29/06* (2006.01)
*G06F 17/30* (2006.01)

(52) U.S. Cl.
CPC ........ *H04L 63/145* (2013.01); *G06F 17/30985* (2013.01)

(58) Field of Classification Search
CPC .................. H04L 63/145; G06F 17/30985
USPC .......... 726/23, 22; 707/2, 6, 101; 1/1; 326/46
See application file for complete search history.

(56) References Cited

U.S. PATENT DOCUMENTS

| | | | | |
|---|---|---|---|---|
| 5,754,847 | A * | 5/1998 | Kaplan et al. ......................... | 1/1 |
| 5,995,963 | A * | 11/1999 | Nanba et al. .......................... | 1/1 |
| 6,021,263 | A | 2/2000 | Kujoory | |
| 6,560,610 | B1 * | 5/2003 | Eatherton et al. ..................... | 1/1 |
| 6,876,559 | B1 * | 4/2005 | Rathnavelu et al. ......... | 365/49.1 |
| 7,085,918 | B2 * | 8/2006 | Sharangpani et al. ........ | 712/217 |
| 7,093,023 | B2 | 8/2006 | Lockwood et al. | |
| 7,093,231 | B2 * | 8/2006 | Nuss .............................. | 717/114 |
| 7,188,168 | B1 * | 3/2007 | Liao .............................. | 709/224 |
| 7,213,634 | B1 | 5/2007 | Evans et al. | |
| 7,216,364 | B2 * | 5/2007 | Zhao et al. ...................... | 726/22 |
| 7,225,188 | B1 | 5/2007 | Gai et al. | |

(Continued)

FOREIGN PATENT DOCUMENTS

| | | |
|---|---|---|
| WO | 03023553 A2 | 3/2003 |
| WO | 2006031659 A2 | 3/2006 |

OTHER PUBLICATIONS

Dimopoulos, V.; Papaefstathiou, I.; Pnevmatikatos, D.;, "A Memory-Efficient Reconfigurable Aho-Corasick FSM Implementation for Intrusion Detection Systems," Embedded Computer Systems: Architectures, Modeling and Simulation, 2007. IC-SAMOS 2007. International Conference on , vol., no., pp. 186-193, Jul. 16-19, 2007.*

(Continued)

*Primary Examiner* — Syed Zaidi
(74) *Attorney, Agent, or Firm* — Shumaker & Sieffert, P.A.

(57) ABSTRACT

In general, techniques are described for network traffic pattern matching using adaptive deterministic finite automata (DFA). A network device may implement the techniques to promote pattern matching. The network device comprises a control unit that stores first and second data defining first and second portions of a DFA, respectively. The first data defines first states of the DFA in an uncompressed format. The second data defines second states of the DFA in a compressed format. The network device also includes an interface that receives network packets. The control unit processes the network packets to traverse the first and second states. The control unit then compares a number of times the first and second states have been traversed. Based on the comparison, the control unit dynamically reallocates the first states of the DFA in the uncompressed format and the second states of the DFA in the compressed format.

28 Claims, 9 Drawing Sheets

(56) References Cited

U.S. PATENT DOCUMENTS

| | | | |
|---|---|---|---|
| 7,260,558 B1* | 8/2007 | Cheng et al. | 706/12 |
| 7,305,383 B1* | 12/2007 | Kubesh et al. | 1/1 |
| 7,308,446 B1* | 12/2007 | Panigrahy et al. | 1/1 |
| 7,499,941 B2 | 3/2009 | Michaeli et al. | |
| 7,558,925 B2 | 7/2009 | Bouchard et al. | |
| 7,685,637 B2 | 3/2010 | Zhao et al. | |
| 7,689,530 B1 | 3/2010 | Williams et al. | |
| 7,802,094 B2 | 9/2010 | Furlong et al. | |
| 8,060,546 B2 | 11/2011 | Law et al. | |
| 2005/0012521 A1* | 1/2005 | Sharangpani et al. | 326/46 |
| 2005/0278781 A1* | 12/2005 | Zhao et al. | 726/22 |
| 2006/0005241 A1* | 1/2006 | Zhao et al. | 726/22 |
| 2006/0085389 A1* | 4/2006 | Flanagan et al. | 707/2 |
| 2006/0101195 A1* | 5/2006 | Jain | 711/104 |
| 2006/0120137 A1* | 6/2006 | Gould et al. | 365/149 |
| 2006/0136570 A1* | 6/2006 | Pandya | 709/217 |
| 2006/0167915 A1* | 7/2006 | Furlong et al. | 707/101 |
| 2006/0242123 A1* | 10/2006 | Williams, Jr. | 707/3 |
| 2007/0130140 A1* | 6/2007 | Cytron et al. | 707/6 |
| 2008/0046423 A1* | 2/2008 | Khan Alicherry et al. | 707/6 |
| 2008/0140661 A1 | 6/2008 | Pandya | |
| 2008/0263665 A1 | 10/2008 | Ma et al. | |
| 2008/0270833 A1* | 10/2008 | McMillen | 714/32 |
| 2009/0063825 A1* | 3/2009 | McMillen et al. | 712/220 |

OTHER PUBLICATIONS

Alicherry, M.; Muthuprasanna, M.; Kumar, V.; , "High Speed Pattern Matching for Network IDS/IPS," Network Protocols, 2006. ICNP '06. Proceedings of the 2006 14th IEEE International Conference on, vol., no., pp. 187-196, Nov. 12-15, 2006.*

Tuck, N.; Sherwood, T.; Calder, B.; Varghese, G.; , "Deterministic memory-efficient string matching algorithms for intrusion detection," INFOCOM 2004. Twenty-third Annual Joint Conference of the IEEE Computer and Communications Societies , vol. 4, no., pp. 2628-2639 vol. 4, Mar. 7-11, 2004.*

Sailesh Kumar, Balakrishnan Chandrasekaran, Jonathan Turner, and George Varghese. 2007. Curing regular expressions matching algorithms from insomnia, amnesia, and acalculia. In Proceedings of the 3rd ACM/IEEE Symposium on Architecture for networking and communications systems (ANCS '07). ACM, New York, NY, USA, 155-164.*

Xiaofei, Wang et al., "Extraction of fingerprint from regular expression for efficient prefiltering", ICCTA '09, IEEE International Conference on Communications Technology and Applications, 2009, IEEE, Piscataway, NJ, USA, Oct. 16, 2009, pp. 221-226.

Navarro, "A Partial Deterministic Automaton for Approximate String Matching," In Proc. 4th South American Workshop on String Processing (WSP197), pp. 112-127, 1997.

Office Action from U.S. Appl. No. 11/738,059, dated Jul. 7, 2010, 21 pp.

Response to Office Action dated Jul. 7, 2010, from U.S. Appl. No. 11/738,059, filed Oct. 7, 2010, 22 pp.

U.S. Appl. No. 12/361,364, entitled "Efficient Application Identification with Network Devices," filed Jan. 28, 2009.

Shan et al., "A Network State Based Intrusion Detection Model," Proceedings of the 2001 International Conference on Computer Networks and Mobile Computing (ICCNMC'01), Oct. 16, 2001, pp. 481-486.

Baker et al., "Automatic Synthesis of Efficient Intrusion Detection Systems on FPGAs," IEEE Transactions on Dependable and Secure Computing, vol. 3, No. 4, Oct.-Dec. 2006, pp. 289-300.

Sourdis et al., "Fast, Large-Scale String Match for a 10Gbps FPGA-Based Network Intrusion Detection System," 13th International Conference on Field-Programmable Logic and Applications, FPL 2003 proceedings, (lecture notes in Computer Science vol. 2778), pp. 880-889, Sep. 2003.

Dharmapurikar et al., "Fast and Scalable Pattern Matching for Content Filtering," Symposium on Architecture for Networking and Communications Systems, ANCS 2005, Oct. 26, 2005, pp. 183-192.

Hutchings et al., "Assisting Network Intrusion Detection with Reconfigurable Hardware," Proceedings of the 10th Annual IEEE Symposium on Field-Programmable Custom Computing Machines, Apr. 22-24, 2002, pp. 111-120.

Stoyanov et al., "Resolving Non-Determinism in NFA," International Conference on Computer Systems and Technologies, Jul. 9, 2003, 5 pgs.

Sutton, "Partial Character Decoding for Improved Regular Expression Matching in FPGAs," Proceedings of the 2004 IEEE International Conference on Field-Programmable Technology, Dec. 6-8, 2004, pp. 25-32.

University of Alaska, "Finite Automata," Aug. 20, 2005, 48 pgs., http://www.math.uaa.alaska.edu/-afkjm/cs351/handouts/finite-automata.ppt.

Final Office Action from U.S. Appl. No. 12/361,364, dated Mar. 27, 2013, 29 pp.

Ficara et al., "An improved DFA for fast regular expression matching," ACM SIGCOMM Computer Communication Review Archive, vol. 38, Is. 5, Oct. 2008, pp. 29-40, [retrieved from ACM database, Jul. 30, 2012].

Katz et al., "Fast and memory-efficient regular expression matching for deep packet inspection," ANCS '06 Proceedings of the 2006 ACM/IEEE Symposium on Architecture for networking and communications systems, pp. 93-102, [retrieved from ACM database, Jul. 30, 2012].

Kumar et al., "Algorithms to accelerate multiple regular expressions matching for deep packet inspection," SIGCOMM '06, Proceedings of the 2006 conference on Applications, technologies, architectures, and protocols for computer communications, pp. 339-350, [retrieved from ACM database, Jul. 30, 2012].

Becchi, "A hybrid finite automaton for practical deep packet inspection," CoNEXT '07 Proceedings of the 2007 ACM CoNEXT conference, Article No. 1, 7pp. [retrieved from ACM database, Jul. 30, 2012].

Office Action from U.S. Appl. No. 12/361,364, dated Aug. 27, 2012, 30 pp.

Response to Office Action dated Aug. 27, 2012, from U.S. Appl. No. 12/361,364, filed Nov. 27, 2012, 24 pp.

* cited by examiner

NETWORK TRAFFIC PATTERN MATCHING USING ADAPTIVE DETERMINISTIC FINITE AUTOMATA

TECHNICAL FIELD

The invention relates to computer networks and, more particularly, to detecting traffic patterns within computer networks.

BACKGROUND

A computer network is a collection of interconnected computing devices that exchange data and share resources. In a packet-based network, such as the Internet, the computing devices (which may be referred to as network devices) communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

For a number of reasons, various network devices throughout the network monitor network traffic to detect patterns within the network traffic. Such devices may perform a form of packet inspection referred to as Deep Packet Inspection (DPI) that involves inspecting the payload or data portion of each packet as well as possibly a header or control portion of each packet across one or more layers of the Open Systems Interconnection (OSI) model. For example, an intermediate network device, such as a network security device referred to as an Intrusion Detection and Prevention (IDP) device, positioned between the source and destination device may perform DPI to determine whether the packets contains patterns indicative of a malicious attack. Upon detecting one of these patterns, the IDP device may detect and possibly prevent the malicious attack.

The pattern matching performed by the IDP devices often requires processing of complex data structures that can consume significant system resources. For example, one way to implement pattern matching involves a finite state machine referred to as a Deterministic Finite Automata (DFA). In general, each DFA is a finite state machine where for each pair of state and input symbol there is one and only one transition to a next state. A matching engine extracts symbols from packets and applies one or more DFAs to detect specified patterns within symbols carried by the network traffic.

SUMMARY

In general, techniques are described for efficient packet inspection within computer networks. More particularly, a network device, such as network security device referred to as an Intrusion Prevention and Detection (IDP) device, may implement the techniques to promote more efficient pattern matching when inspecting packets. As described herein, the IDP device may perform Deep Packet Inspection (DPI) using a hybrid implementation of a Deterministic Finite Automata (DFA). This hybrid implementation involves a first portion of the DFA being implemented in accordance with a computationally efficient or high-throughput implementation, e.g., an array DFA implementation, and a second portion of the DFA being implemented in accordance with a memory efficient or compressed implementation, e.g., a bitmap DFA implementation.

The techniques described in this disclosure enable adaptive or dynamic reconfiguration of the states of the DFA from the first and second implementations in memory in response to monitored usage of the various states within each of the computationally efficient and memory efficient implementations. Through monitoring of these states, the IDP device may reconfigure individual states of the DFA from the compressed implementation to the high-throughput implementation (referred to herein as "promoting" the states) and reconfigure individual states from the high-throughput implementation to the compressed implementation (referred to herein as "demoting" the states). The dynamic reconfiguring of states may enable an adaptive hybrid DFA that significantly improves packet throughput over compression-only implementations with reduced memory consumption over high-throughput-only implementations. Moreover, this adaptive hybrid implementation reduces, if not substantially eliminates, inefficient memory usage that may result from the same states (i.e., data) being redundantly stored to both portions of the DFA.

In example operation, a network device stores first data that defines an array portion of a hybrid deterministic finite automata (DFA). The network device also stores second data that defines a bitmap portion of the hybrid DFA. More specifically, the first data defines a first set of array states of the hybrid DFA, which are in an uncompressed format, and the second data defines a second set of bitmap states of the hybrid DFA, which are in a compressed format. The network device then utilizes the hybrid DFA to identify patterns within received packet flows. The network device receives these packet flows via a network interface, such as a network interface card, and performs, in various instances, some form of application identification to identify to which application each of the packet flows correspond. The network device may, in some instances, maintain a plurality of hybrid DFAs, each of which are associated with a different application (e.g., HTTP, FTP, and the like). In this instance, after identifying the application to which a particular packet flow corresponds, the network device may retrieve the hybrid DFA(s) associated with the identified application and traverse this hybrid DFA to determine whether the packet flow includes a pattern indicative of a malicious attack.

While traversing the hybrid DFA, the network device may periodically, according to a sampling interval, update counters associated with each of the states currently being traversed by the network device according to a sampling interval. Also periodically, the network device may compare the counters associated with array states to the counters associated with the bitmap states. Typically, the network device compares a greatest counter, e.g., the counter storing the largest count value, of one of the bitmap states to each of the counters of the array states to identify any of the array states that have been traversed less frequently than the most frequently traversed bitmap state. In this way, the network device determines whether to promote the most frequently used bitmap state to an array state and whether to demote one or more of the array states to bitmap states. The network device then dynamically reallocates those of the identified array states to the bitmap portion by converting the identified array states into new bitmap states, deleting the array states and inserting the new bitmap states into the bitmap portion in a manner that maintains the organization and relationship of the states within the DFA. The network device also dynamically reallocates the one of the bitmap states associated with the greatest counter to the array portion by converting this bitmap state into a corresponding array state, deleting this bitmap state from the bitmap portion and inserting the corresponding bitmap state into the array portion. In this sense, the network device provides adaptive reconfiguration of the states of the DFA from the first and second implementations in memory in response to monitored usage of the various states within each of the computationally efficient and memory efficient implementations.

In one embodiment, a method comprises storing, with a network device, first data that defines a first portion of a deterministic finite automata (DFA), wherein the first data defines a first set of states of the DFA in an uncompressed format, storing, with the network device, second data that defines a second portion of the DFA, wherein the second data defines a second set of states of the DFA in a compressed format, and processing network packets to traverse the first set of states and the second set of states of the DFA with the network device. The method also comprises comparing, with the network device, a number of times one or more of the first set of states and one or more of the second sets of states have been traversed by the network device, and dynamically reallocating the first set of states of the first portion of the DFA in the uncompressed format and the second set of states of the second portion of the DFA in the compressed format based on the comparison.

In another embodiment, a network device comprises a control unit that stores first data that defines a first portion of a deterministic finite automata (DFA), wherein the first data defines a first set of states of the DFA in an uncompressed format and stores second data that defines a second portion of the DFA, wherein the second data defines a second set of states of the DFA in a compressed format. The network device also comprises at least one interface that receives incoming network traffic comprising network packets. The control unit further processes the network packets to traverse the first set of states and the second set of states of the DFA, compares a number of times one or more of the first set of states and one or more of the second sets of states have been traversed, and dynamically reallocates the first set of states of the first portion of the DFA in the uncompressed format and the second set of states of the second portion of the DFA in the compressed format based on the comparison.

In another embodiment, a computer-readable storage medium comprising instructions for causing a programmable processor to store, with a network device, first data that defines a first portion of a deterministic finite automata (DFA), wherein the first data defines a first set of states of the DFA in an uncompressed format, store, with the network device, second data that defines a second portion of the DFA, wherein the second data defines a second set of states of the DFA in a compressed format, process network packets to traverse the first set of states and the second set of states of the DFA with the network device, compare, with the network device, a number of times one or more of the first set of states and one or more of the second sets of states have been traversed by the network device, and dynamically reallocate the first set of states of the first portion of the DFA in the uncompressed format and the second set of states of the second portion of the DFA in the compressed format based on the comparison.

In another embodiment, a method comprises storing, with a device, first data that defines a first portion of a state machine, wherein the first data defines a first set of states of the state machine in an uncompressed format, storing, with the device, second data that defines a second portion of the state machine, wherein the second data defines a second set of states of the state machine in a compressed format, and processing input data to traverse the first set of states and the second set of states of the state machine with the device. The method also comprises comparing, with the device, a number of times one or more of the first set of states and one or more of the second sets of states have been traversed by the device, and dynamically reallocating the first set of states of the first portion of the state machine in the uncompressed format and the second set of states of the second portion of the state machine in the compressed format based on the comparison.

In another embodiment, a device comprises a control unit that stores first data that defines a first portion of a state machine, wherein the first data defines a first set of states of the state machine in an uncompressed format and stores second data that defines a second portion of the state machine, wherein the second data defines a second set of states of the state machine in a compressed format. The network device also comprises at least one interface that receives input data. The control unit further processes the input data to traverse the first set of states and the second set of states of the state machine, compares a number of times one or more of the first set of states and one or more of the second sets of states have been traversed, and dynamically reallocates the first set of states of the first portion of the state machine in the uncompressed format and the second set of states of the second portion of the state machine in the compressed format based on the comparison.

In another embodiment, a computer-readable storage medium comprising instructions that cause a processor to store, with a device, first data that defines a first portion of a state machine, wherein the first data defines a first set of states of the state machine in an uncompressed format, store, with the device, second data that defines a second portion of the state machine, wherein the second data defines a second set of states of the state machine in a compressed format, process input data to traverse the first set of states and the second set of states of the state machine with the device, compare, with the device, a number of times one or more of the first set of states and one or more of the second sets of states have been traversed by the device, and dynamically reallocate the first set of states of the first portion of the state machine in the uncompressed format and the second set of states of the second portion of the state machine in the compressed format based on the comparison.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
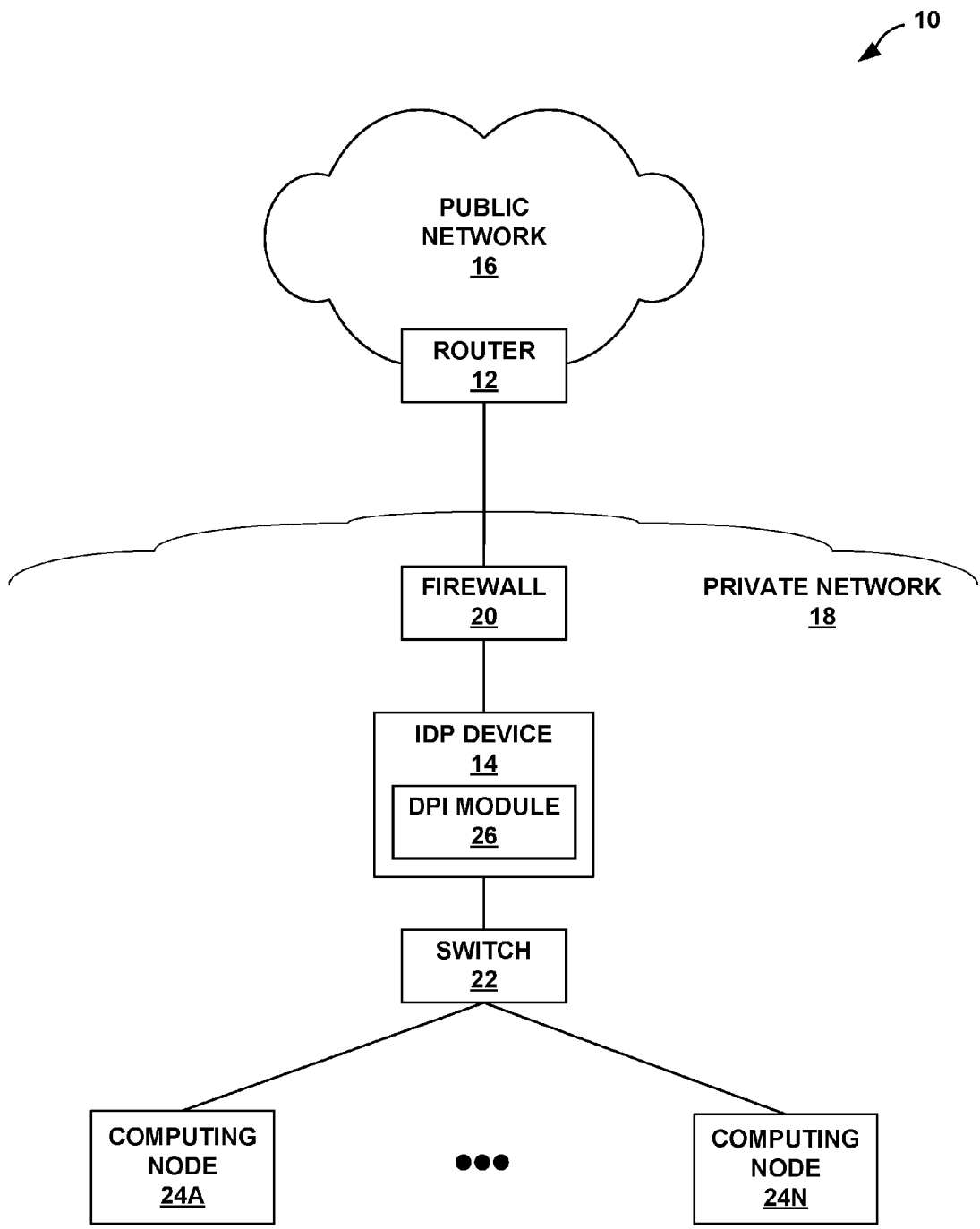
FIG. 1 is a block diagram illustrating an exemplary network system in which a network device implements the techniques described in this disclosure to more efficiently inspect packets and perform pattern matching.

FIG. 1 is a block diagram illustrating an exemplary network system 10 in which a network device implements the techniques described in this disclosure to more efficiently inspect packets and perform pattern matching. While described herein with respect to an exemplary network device, e.g., an Intrusion Detection and Prevention (IDP) device 14 ("IPD device 14"), any network device, such as router 12, may implement the improved DPI techniques described herein.

As shown in the example of FIG. 1, network system 10 includes two networks, a public network 16 and a private network 18. Public network 16 comprises any publicly accessible computer network, such as the Internet. Public network 16 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection. Typically, these devices communicate with one another via a packet-based protocol, such as an Internet Protocol (IP)/Transmission Control Protocol (TCP). As a result, public network 16 may represent or be referred to as a "packet-based" computer network.

Public network 16 includes router 12, which typically maintains routing information (not shown in FIG. 1) that identifies routes or paths through public network 16 by which to reach corresponding destinations. Router 12 distills these paths into forwarding information (again, not shown in FIG. 1) that identifies a "next hop" for each of these routes. A next hop identifies an interface by which to forward a packet along a given path. Router 12 receives packets and accesses the forwarding information based on information (e.g., a header) included within the packet to determine a next hop for the route along which the packet is traveling. Router 12 then forwards the packet via the interface identified by the next hop. In this manner, router 12 routes packets received both from public network 16 and private network 18 to the packet's intended destination.

Private network 18 represents, in one instance, a network that is owned, operated and maintained typically by a private entity, such as an enterprise or business, and which is not generally accessible by the public. Private network 18 includes a firewall 20, a switch 22, a plurality of computing nodes 24A-24N ("computing nodes 24") and IDP device 14. Firewall 20 represents, in various aspects, a network security device that protects private network 18 and, in particular, computing nodes 24. Firewall 20 usually protects these nodes 24 by performing gatekeeper services, such as a Network Address Translation (NAT). Usually, these gatekeeper services rely solely on network layer information, such as IP addresses and ports, parsed from a header of each packet.

In other words, firewall 20 often acts as a gatekeeper to private network 18 by inspecting IP addresses and ports to ensure that traffic entering private network 18 only enters in response to a previously sent traffic from one or more of computing nodes 24. This, in effect, helps reduce unauthorized access to private network 18, much like a gatekeeper, thereby possibly preventing the public from accessing private network 18. Also firewall 20, by performing NAT, obscures an internal configuration of private network 18 to prevent malicious entities or "hackers" from utilizing known weaknesses in the internal configuration.

Switch 22 represents a network device capable of performing forwarding of traffic among various end-points, such as computing nodes 24. While shown as a single switch 22, private network 18 in conjunction with or as an alternative to switch 22 employs, in some cases, a hub, a router or other network device capable of performing switching and/or routing of data to and from nodes 24. Moreover, while shown as comprising a single firewall device 20 and a single switch 22 for ease of illustration purposes, private network 18 may also include a plurality of firewalls similar to firewall 20 and a plurality of switches similar to switch 22. The techniques therefore should not be limited to the exemplary embodiment shown in FIG. 1.

IDP device 14 comprises one example of a network security device capable of detecting and possibly preventing network attacks. Typically, IDP device 14 applies one or more sets of attack patterns to detect one or more network attacks. Each set of attack patterns corresponds, in various aspects, to the set of network attacks and which, when applied to both incoming and outgoing traffic, enables IDP device 14 to detect each corresponding set of network attacks. "Incoming network traffic," as used herein, comprises both traffic leaving and entering private network 18 and thus refers to traffic incoming with respect to IDP device 14. Likewise, the use of "outgoing traffic" herein refers not to any particular direction but merely to traffic leaving IDP device 14 from the perspective of IDP device 14. Thus, incoming and outgoing refers to the direction of traffic from the perspective of IDP device 14 and do not denote any particular direction or flow of traffic between public and private networks 16 and 18, respectively.

IDP device 14 applies the one or more sets of attack patterns identified to network traffic flowing in both directions (i.e., inbound traffic received from public network 16 as well as outbound traffic destined to public network 16) to improve the accuracy in detecting network attacks. For example, IDP device 14 applies these attack patterns to both Client-To-Server (CTS) and Server-To-Client (STC) communications between public network 16 and computing nodes 24. IDP device 14 also analyzes the network traffic, in some instances, to correlate traffic in one direction with traffic in the opposite direction for each communication session detected within the network traffic. For each client-server communication session, IDP device 14 may identify a packet flow in one direction (e.g., a CTS communication flow for a particular software application on the client) and a corresponding packet flow in the opposite direction (e.g., response STC communications flowing from the server to the client for that same software application).

In various aspects, IDP device 14 identifies the packet flows in the monitored traffic, and transparently reassembles application-layer communications from the packet flows. Reassembling application-layer communications may involve buffering a plurality of packets for a given flow, reordering the plurality of packets, parsing payload or application-layer data from each of the packets, and reforming the application-layer communication from the parsed application-layer data. IDP device 14, as one example, includes a set of protocol-specific decoders to analyze the application-layer communications and identify application-layer transactions. In general, a "transaction" refers to a bounded series of related application-layer communications between peer devices.

For example, a single TCP connection can be used to send (receive) multiple HyperText Transfer Protocol (HTTP) requests (responses). As one example, a single web-page comprising multiple images and links to HTML pages is fetched using a single TCP connection. An HTTP decoder is invoked by IDP device 14 to identify each request/response within the TCP connection as a different transaction. This may be useful to prevent certain attack definitions or attack patterns from being applied across transaction boundaries. In one embodiment, a transaction is identified according to source and destination IP address, protocol, and source and destination port numbers, which is commonly referred to as a "five-tuple." Other embodiments may identify a transaction in other ways, for example, by using media access control ("MAC") addresses.

For each transaction, the corresponding decoder may analyze the application-layer communications and extract protocol-specific elements. As an example, for an FTP login transaction, the FTP decoder extracts data corresponding to a user name, a name for the target device, a name for the client device and other information. In addition, the decoders may analyze the application-layer communications associated with each transaction to determine whether the communications contain any protocol-specific "anomalies." In general, a protocol anomaly refers to any detected irregularity within an application-layer communication that does not comply with generally accepted rules of communication for a particular protocol. The rules, for example, are defined by published standards as well as vendor-defined specifications. Other anomalies refer to protocol events (i.e., actions) that technically comply with protocol rules but that may warrant a heightened level of scrutiny.

One example of such a protocol event is repeated failure of a File Transfer Protocol (FTP) login request. Example anomalies for the HTTP protocol include missing HTTP version information, malformed universal resource locators ("URLs"), directory traversals, header overflow, authentication overflow and cookie overflow. Example anomalies for a Simple Mail Transfer Protocol (SMTP) include too many recipients, relay attempts, and domain names that exceed a defined length. Example anomalies for a Post Office Protocol version 3 (POP3) include user overflow and failed logins. Additional anomalies for FTP include missing arguments, usernames or pathnames that exceed a defined length and failed logins. Other anomalies include abnormal and out-of-specification data transmissions, and commands directing devices to open network connections to devices other than the client devices issuing the commands.

IDP device 14 applies the one or more sets of attack patterns to the extracted elements and the protocol-specific anomalies identified by the protocol decoders to detect and prevent network attacks. These attack patterns, when applied to incoming and outgoing traffic, may therefore identify one or more attack signatures, protocol anomalies and other malicious behavior based on application layer data and other stateful protocol information. Moreover, IDP device 14 typically associates a particular set of the patterns with a protocol that corresponds to a particular application. For a given communication session intercepted by IDP device 14, In this instance, IDP device 14 attempts to identify the application type and underlying protocol for the packet flows of the session in order to select one or more of the one or more sets of patterns to apply to the packet flows. In the event IDP device 14 detects a network attack, IDP device 14 takes one or more programmed actions, such as automatically dropping packet flows associated with the application-layer communications within which the network attack was detected to prevent the attack, thereby preserving network security.

IDP device 14 includes a Deep Packet Inspection (DPI) module 26 ("DPI module 26") that represents a hardware or hardware and software module that maintains the one or more sets of attack patterns. DPI module 26 stores data defining a Discrete Finite Automata (DFA) that represents each of the one or more sets of attack patterns. DPI module 26 associates each of the one or more DFAs with a given protocol. For example, DPI module 26 stores data defining a plurality of DFAs and associate one DFA with HTTP, another DFA with FTP, a third DFA with SMTP, a fourth DFA with a Session Initiation Protocol (SIP), and so on. Upon identifying the protocol, and thereby the particular application, to which packets of a particular network flow correspond, DPI module 26, in various aspects, invokes the corresponding one of the plurality of DFAs and traverse this invoked DFA to apply attack patterns to detect a network attack, protocol anomaly or any other malicious behavior.

That is, DFAs, as described below in more detail, comprise, as one example, a graph data structure (or "graph," for short) having a plurality of interconnected nodes. Each node, except for possibly terminal nodes, of the graph defines a state, as well as, a condition by which to traverse to other nodes of the graph. These states are therefore commonly referred to as "transition nodes." Terminal nodes, e.g., nodes of the graph that defines states but no condition, generally store data identifying the pattern. DPI module 26 then traverses the transition nodes of a given DFA to reach a terminal node and, upon reaching a terminal node, determine that a given network flow includes an attack pattern. In this instance, DPI module 26 takes an action with respect to the packets of the network flow, such as dropping all subsequent packets, quarantining all subsequent packets, issuing an alert or other warning to an administrator, or any other action. DPI module 26 may, however, also traverse these transition nodes, but fail to reach a terminal node, whereupon DPI module 26 may or may not detect an attack pattern in the network flow. In this instance, DPI module 26 does not take any action and IDP device 14 continues to forward packets for this network flow.

In accordance with the principles of the invention as set forth in this disclosure, IDP device 14 implements the techniques described herein to more efficiently perform DPI so as to, in this example, detect network attacks. In particular, DPI module 26 implements the techniques described herein to possibly improve computational speed of traversing the DFAs to apply the attack patterns used to detect network attacks while also reducing the amount of space each DFA consumes in a memory (or other types of storage mediums, such as a hard drive or an optical disk) of IDP device 14.

While described herein with respect to a particular use of DFAs, e.g., DPI, the techniques apply generally to any aspect whereby DFAs are used in identifying particular strings or character patterns. For example, IDP device 14, although not shown in FIG. 1, includes an Application Identification (AI) module in some instances. This AI module may represent a hardware or hardware and software module that implements application identification algorithms to identify a type of application to which each packet, or packet flow, corresponds. The AI module, as one example, stores data defining a plurality of additional Deterministic Finite Automata (DFA). The AI module then traverses the nodes of one or more of these additional DFA graphs until reaching a terminal node associated with a particular application. Upon reaching this terminal node, the AI module associates the packet or packet flow with the network application identified by the terminal node. In this manner, the AI module then identifies network applications and thereby enable IDP device 14 to select one of the one or more sets of attack patterns (e.g., one of the DFA stored by DPI module 26) to apply to packet flows.

In some instances, router 12 also includes an AI module that performs substantially similar operations to the above described AI module of IDP device 14 in order to identify a network application to which a packet or packet flow corresponds. In this respect, the router AI module also typically includes a similar plurality of additional DFAs, where each of these DFAs comprises a graph data structure having a plurality of interconnected nodes. At least some of the nodes are terminal nodes that are associated with a network application.

Again, this AI module traverses these DFA graphs, and upon reaching one of these terminal nodes, associate the packet or packet flow with the network applications identified by the reached terminal node. However, rather than utilize the identified application for selecting a given one of the one or more sets of patterns similar to IDP device 14, router 12 utilizes the identified application, as one example, to select a particular one of a plurality of Quality of Service (QoS) classes. In other words, router 12, upon identifying an application to which a packet or, more specifically, a packet flow corresponds, generally selects one of the plurality of QoS classes based on the identified application.

More detail concerning these other uses of DFA are described in U.S. patent application Ser. No. 12/361,364, titled "Efficient Application Identification with Network Devices," filed Jan. 28, 2009, the contents of which are herein incorporated by reference as if fully set forth in its entirety. The techniques described in this disclosure related to a dynamic hybrid DFA may apply to any network device, including exemplary router 12 and IDP device 14, that employ DFAs to perform any form of pattern matching, including AI for purposes of service provisioning or IDP for purposes of efficient network attack detection, as outlined above. The techniques of this disclosure therefore should not be limited to the below described exemplary DFAs used to detect patterns indicative of network attacks. In any event, IDP device 14, in accordance with the adaptive hybrid DFA techniques set forth in this disclosure, stores first data that defines a first portion of a dynamic hybrid DFA. The first data defines a first set of states of this DFA in an uncompressed format. Typically, this uncompressed format comprises an array data structure, which may be an array DFA or, in the context of the herein disclosed dynamic hybrid DFA, an array portion of the DFA. In one embodiment, the array data structure typically includes 256 entries, each entry consuming, as one example, two bytes of memory for a total of 512 bytes of memory consumed per state in the array DFA implementation. Each state of the array DFA contains 256 entries as each entry corresponds to a different one of the 256 American Standard Code for Information Interchange (ASCII) characters.

IDP device 14 also stores second data that defines a second portion of the dynamic hybrid DFA. The second data defines a second set of states of the hybrid DFA in a compressed format. Typically, this compressed format comprises a bitmap data structure, which may be a bitmap DFA or, in the context of the herein disclosed dynamic hybrid DFA, a bitmap portion of the DFA. This bitmap data structure includes 256 entries, each entry consuming, as one example, a single bit of memory for a total of at least 32 bytes of memory consumed per state in the bitmap DFA implementation.

In the bitmap portion, each entry indicates either a default state or one of at least one non-default state. The default state consumes two bytes in memory and defines a next state to traverse when a match does not occur. As no match is likely to occur for a number of the 242 characters, the use of a common default state for a plurality of the 256 entries effectively compresses duplicative entries and reduces memory consumption. Each of the non-default states also consumes two bytes, but defines a corresponding next state to traverse when a match occurs. However, non-default states are not duplicative but unique for a given entry and each non-default state is therefore separately defined. Moreover, each non-default state may be dynamically allocated to further reduce memory consumption. Still, the bitmap DFA effectively reduces memory consumption in most instances, such as in malicious attack pattern matching. As this DFA includes both a portion implemented using the array data structure and another portion implemented using the bitmap data structure, this DFA may be referred to as a hybrid DFA.

To traverse the hybrid DFA, IDP device 14 receives a packet, which undergoes processing by the protocol decoders to extract application-layer elements. The protocol decoders identify an application to which the packet belongs and forward this packet or, at least a payload of the packet or a pointer to the packet to DPI module 26. DPI module 26 may identify one of a plurality of DFAs, each of or at least one of which may comprise the above described hybrid DFA. IDP device 14 may parse a first character, e.g., two bytes, from the payload, where this first character is generally referred to as a symbol. Using this symbol, IDP device 14 traverses a first state of the hybrid DFA to determine an entry that defines a character matching this input symbol. Typically, this first state is defined within the array portion of the hybrid DFA, as the array portion provides faster processing on input symbols, while the bitmap portion reduces memory consumption but requires additional processing time as described above.

Upon locating an entry in this array portion of the hybrid DFA, IDP device 14 traverses to the next state indicated by the located entry. In addition, IDP device 14, before traversing to the next sate indicated by the located entry, updates a counter or other data structure that records the number of times IDP device 14 has traversed this state. IDP device 14 may, in some instances, update this traversal counter periodically or during a sampling interval to reduce any resource burden on maintaining the record. The sampling interval may refer to another counter that counts, as one example, the number of packets processed by IDP device 14 and software that provides a sample trigger that defines the number of packets to process before initiating sampling and updating of the traversal counter.

For example, the sampling interval may define a sample count of zero initially, which DPI module 26 updates upon receiving and processing each consecutive packet with respect to the hybrid DFA for purposes of pattern matching. The sample trigger may specify that 1000 packets need be processed in this way before a sample is taken. Once DPI module 26 updates the sample count to equal or exceed 1000, DPI module 26 may take a sample by updating the traversal counter associated with the state in the hybrid DFA that DPI module 26 traversed for the 1000$^{th}$ packet. DPI module 26 may then reset the sample count to zero and begin again, effectively defining a sampling interval before the next state transition is recorded. In this way, this sampling interval may reduce overhead associated with maintaining the hybrid DFA in the dynamic manner described in more detail below.

In some instances, DPI module 26 stores the hybrid DFA as data defining a list or table of pointers, where each pointer identifies a state of either the array or bitmap portion of the hybrid DFA. To retrieve the first state, as an example, DPI module 26 locates the state referenced by the first pointer in the table. Each entry of this first state identifies another state, by number or other variable or identifier, which DPI module 26 uses as an offset into the list or table of pointers. In the example above, the located entry may identify a next state by a number, such as four, whereupon DPI module 26 locates the fourth pointer in the list of pointers and retrieve the state referenced by this fourth pointer. This next sate may correspond to either the array or bitmap data structure. The use of the list or table of pointers may dissociate the underlying type of data structure used to represent a state from the overall implementation of the DFA, thereby enabling the hybrid DFA that utilizes a fixed-size array data structure and a dynamically allocated bitmap data structure without incurring extensive overhead to maintain these two diametrically opposite data structures in terms of data allocation.

DPI module 26 continues to parse characters from the packet and traverse the states of the hybrid DFA until DPI module 26 reaches a terminal node. If the terminal node indicates no match or, in other words, that a malicious pattern has not been detected, DPI module 26 forwards the packet to the destination identified in the header of the packet. If the terminal node indicates a match or, in other words, that a malicious pattern is detected, DPI module 26 detain or otherwise prevent forwarding of the packet, e.g., "drop" the packet, or take some other action with respect to the packet to neutralize and possibly eliminate the threat of attack. DPI module 26 proceeds in this manner to inspect the payloads of packets using DFAs to perform the DPI. Throughout this packet processing, DPI module 26 may update the traversal counters associated with each entry of each state, as described above. DPI module 26 then, at some set interval, compares the traversal counters for each of the states and dynamically reallocate, reconfigures or otherwise reconstructs one or more states of the array portion and one or more states of the bitmap portion between these portions of the hybrid DFA based on the comparison. For example, assuming that the hybrid DFA includes five states, two of which are implemented using the array data structure and three of which are implemented using the bitmap data structure, DPI module 26 may determine that the two array states are associated with traversal counters indicating traversal values of 5 and 2, respectively, and that the three bitmap states are associated with traversal counters indicated traversal values of 3, 2 and 1. The following Table 1 summarizes the above defined example state of the hybrid DFA:

TABLE 1

| State Number | Implementation | Traversal Counter Value |
|---|---|---|
| 1 | Array | 5 |
| 2 | Array | 2 |
| 3 | Bitmap | 3 |
| 4 | Bitmap | 2 |
| 5 | Bitmap | 1 |

Give the above Table 1, DPI module 26 may compare the traversal counter values shown in the third column and determine that bitmap state number three was traversed at least one more time than array state number 2. Based on this comparison, DPI module 26 may dynamically reallocate bitmap state number 3 by reconstructing bitmap state number 3 as an array state while also reconstructing array state 2 as a bitmap state. DPI module 26 may also reset the traversal counter values in response to this dynamic reallocation. The results of the preceding actions on the state of the hybrid DFA are shown in the following Table 2:

TABLE 2

| State Number | Implementation | Traversal Counter Value |
|---|---|---|
| 1 | Array | 0 |
| 2 | Bitmap | 0 |
| 3 | Array | 0 |
| 4 | Bitmap | 0 |
| 5 | Bitmap | 0 |

In Table 2, state number three has been promoted to an array implementation while state number two has been demoted to a bitmap implementation. Notably, the traversal counter values set forth in the third column of Table 2 have been reset to zero.

In one embodiment, DPI module 26 may control the order of promotion and demotion of states so as to conserve memory during the process. For example, DPI module 26 first demotes states based on the comparison of traversal counters, as an array implementation of a given state typically consumes more memory than a corresponding bitmap implementation of that same state, and the available memory may not provide enough storage to store an additional array implementation that occurs by first promoting a bitmap state (which generates an additional array state). In any event, DPI module 26 demotes an array implementation of a state by, as one example, converting the array implementation into a bitmap implementation, updating the pointer referencing the old array implementation to reference the new bitmap representation and deleting the now old array implementation, which frees up at least 512 bytes in the memory. In this instance, DPI module 26 then promotes the identified bitmap entry, e.g., bitmap state number 3 in the example above, by converting the state from the bitmap implementation to the array implementation, updating the corresponding pointer to point to this new implementation and deleting the old bitmap implementation. Further details regarding this conversion process for both promotion and demotion are described below.

In this manner, the IDP device may perform Deep Packet Inspection (DPI) using an adaptive hybrid implementation of a DFA. This adaptive hybrid implementation involves a first data structure portion of the DFA being implemented in accordance with a computationally efficient or high-throughput implementation, e.g., an array DFA implementation, and a second data structure portion of the DFA being implemented in accordance with a memory efficient or compressed implementation, e.g., a bitmap DFA implementation. The array implementation may be computationally efficient in that a limited number of memory accesses are required to traverse between stated, e.g., a memory access to locate the correct pointer identified by the matching entry and a second memory access to retrieve the next state. The bitmap implementation may require additional memory accesses than those required by the array implementation in that memory accesses are required to locate either the default state or the non-default state, to access the point in the list of pointers identified by the default or non-default state, and to retrieve the next state referenced by the accessed pointer. Yet, as described above the bitmap implementation effectively compresses the state by reducing redundant default states.

Accordingly, the techniques described in this disclosure may enable adaptive or dynamic reconfiguring of states of the DFA between the first and second implementations in response to monitored usage of the various states within each of the computationally efficient and memory efficient implementations. Through monitoring of these states, the IDP device promotes states from the compressed implementation to the high-throughput implementation and demotes states from the high-throughput implementation to the compressed implementation. This dynamic reconfiguring of states may provide a hybrid DFA that significantly improves packet throughput over compressed-only implementations with reduced memory consumption over high-throughput-only implementations. Moreover, this hybrid implementation reduces, if not substantially eliminates, inefficient memory usage that may result from the same states (i.e., data) being stored to both portions of the DFA, as may be common in conventional hybrid DFA implementations.

Figure 2:
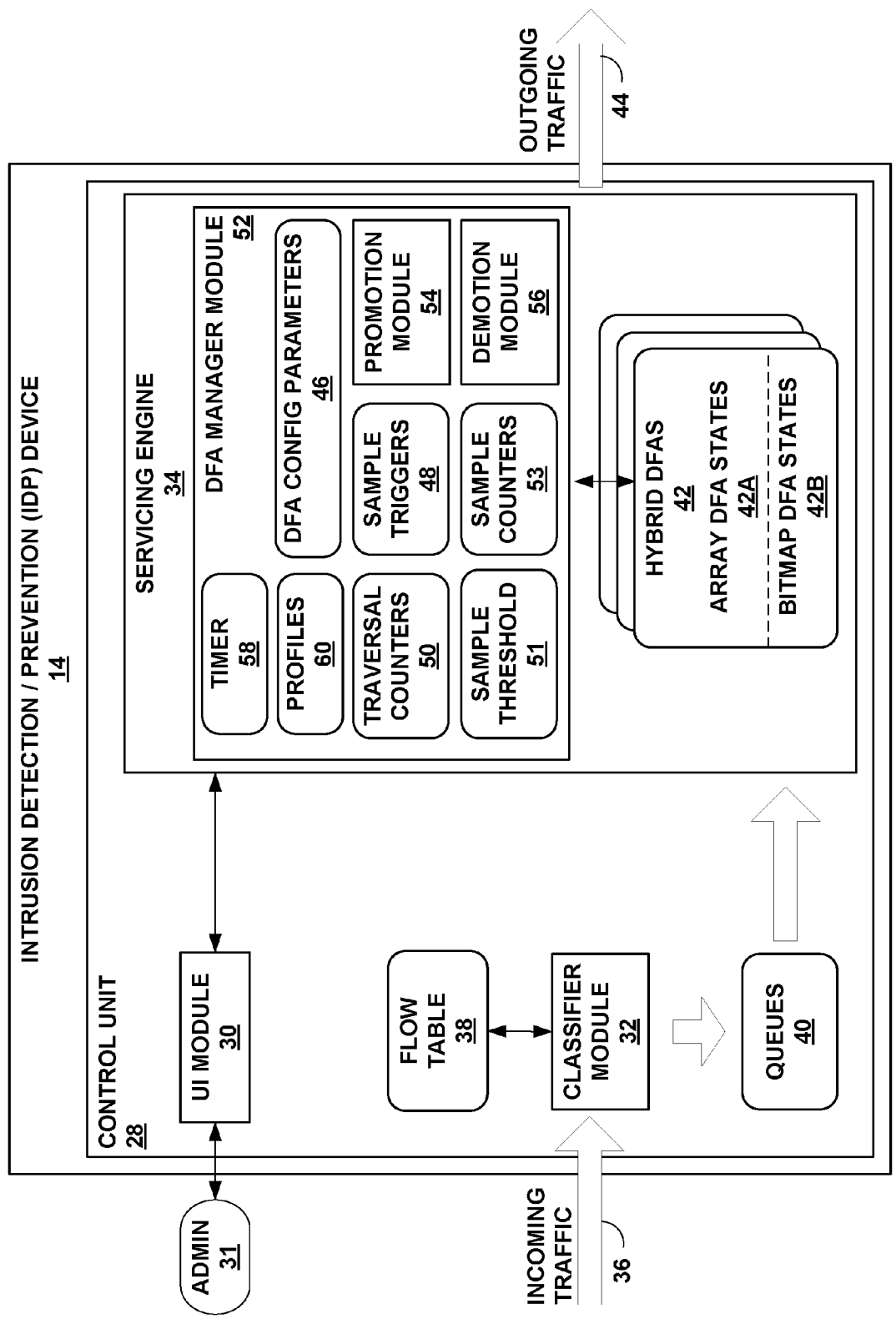
FIG. 2 is a block diagram illustrating a network device of FIG. 1 in more detail

FIG. 2 is a block diagram illustrating IDP device 14 of FIG. 1 in more detail. IDP device 14 includes control unit 28, which may comprise hardware, e.g., one or more of a programmable processor, a Field Programmable Gate Array (FPGA), an Application Specific Special Product (ASSP), an Application Specific Integrated Circuit (ASIC), an integrated circuit, etc., and a computer-readable storage medium or memory, e.g., static memory (a hard drive, an optical drive, a disk drive, FLASH memory, etc.) and/or dynamic memory (a Random Access Memory or RAM, dynamic RAM or DRAM, etc.). In some instances, the computer-readable storage medium comprises instructions, such as those used to define a software or computer program, that cause the above listed programmable processor to perform the dynamic policy provisioning techniques described herein.

Control unit 28 includes a user interface module 30 ("UI module 30"), a classifier module 32 and a servicing engine module 34 ("servicing engine 34"). Each of these modules 30-34 represents hardware or a combination of hardware and software that perform the below described functions attributed to each. In some embodiments, control unit 28 comprises one or more programmable processors that each executes one or more of modules 30-34 as software or computer programs, e.g., instructions, that cause the processors to perform the functions described below with respect to modules 30-34. In other embodiments, control unit 28 comprises one or more integrated circuits that implement one or more of modules 30-34. The techniques therefore should not be limited to any one implementation of the techniques described herein.

UI module 30 represents a module for interfacing with a user, such as admin 31, or another computing device. In various aspects, UI module 30 presents one or more graphical user and/or text-based user interfaces by which admin 31 or another computing device configures IDP device 14. UI module 30, in some embodiments, enables script-based configuration by way of the text-based user interface, such as a command line interface (CLI).

Classifier module 32 represents a module that classifies each of the packets based on information extracted from each packet. One exemplary way in which classifier module 32 classifies a packet is to classify each packet as belonging to a particular flow. That is, classifier module 32, in accordance with this exemplary way, determines to which flow a particular one of the packets of incoming network traffic 36 corresponds by extracting information referred to as a "five-tuple" from each of the packets. As described above, each flow represents a flow of packets in one direction within the network traffic. A five-tuple, also as described above, comprises a source Internet Protocol (IP) address, a destination IP address, a source port, a destination port, and a protocol. Typically, the five-tuple is found within the header of each of the packets and classifier module 32 parses or otherwise extracts the five-tuple from the header of each of the packets to identify to which flow each of the packets corresponds. Classifier module 32 may also extract and utilize additional information to identify a flow, such as source media access control ("MAC") address and destination MAC address.

Based on this five-tuple, classifier module 32 accesses flow table 38 or any other data to determine whether the flow to which the packet corresponds has been previously classified. Flow table 38 typically comprise data defining a table data structure having a plurality of entries, where each of the entries identify, typically by way of the five-tuple, an active or current packet flow, as well as, additional information pertinent to forwarding packets of the packet flow, such as a QoS class, an application classification, and other information. In this exemplary instance, each flow entry stores the identifying five-tuple and a reference to a particular application to which the flow has been classified, e.g., an application identifier.

Classifier module 32 may classify packets by an application to which these packets correspond through a process referred to as Application Identification or AI. Applications include a Hyper-Text Transfer Protocol (HTTP) application, a Session Initiation Protocol (SIP) application (which, in some instances, may initiate a VoIP session), a Real-time Transfer Protocol (RTP) application (which, in some instances, may provide a transport for the VoIP session), a File Transfer Protocol (FTP) application, or any other network application for delivering content or data particular to a given protocol or application. In typical implementations, classifier module 32 includes an AI module mentioned above, but not shown in FIG. 2, by which to classify these packets. This AI module includes a plurality of protocol decoders, where each protocol decoder may correspond to a different application layer protocol and analyze the packet to determine whether the packets corresponds to the associated application.

Classifier module 32 may then associate each identified application with a given flow in the flow table by creating a new entry in flow table 38 and updating this new entry with the five-tuple identifying the given flow and the application identifier that identifies the determined application. For example, the AI module may, determine that a first packet, for example, corresponds to an HTTP application, while another packet belongs to an FTP application. Based on these respective classifications, classifier module 32 may associate a first application identifier identifying the HTTP application with the first packet classified as belonging to the HTTP application and associate a second application identifier identifying the FTP application with the second packet classified as belonging to the FTP application in flow table 38. Classifier module 32 may then tag or otherwise mark each packet to indicate the associated application identifier that identifies the application to which each packet has been classified as belonging. Classifier module 32 may tag each packet by storing metadata or other information with each packet in a queue, such as one of queues 40. Queues 40 may comprise pre-processing queues that store packets in a first-in, first-out (FIFO) manner prior to processing by servicing engine 34.

Servicing engine 34 represents a module that services or otherwise processes the packets of incoming traffic 36. Servicing engine 34 may service or process each packet by applying one of a plurality of hybrid DFAs 42. One or more of the plurality of hybrid DFAs 42 may correspond to a different application and may be associated with a different application identifier. These hybrid DFAs 42 may therefore detect attack patterns indicative of a malicious attacks that attack particular vulnerabilities of the corresponding application. By associating the attack patterns defined by each of the plurality of hybrid DFAs 42 to specific applications, servicing engine 34 may more quickly process incoming traffic 36 by applying only a subset of the total suite of attack patterns that are relevant to a particular application.

While described as being associated with application in a one-to-one relationship, one or more of the plurality of hybrid DFAs 42 may be associated with two or more or a plurality of applications. Moreover, one or more of the plurality of hybrid DFAs 42 may apply the entire suite of attack patterns or may apply select subsets of the attack patterns (such as the most common attack patterns) regardless of application. These hybrid DFAs 42 that apply the full set of attack patterns may be referred to as default DFAs in that these DFAs may be applied when classifier module 32 is unsuccessful in classifying particular flows. Furthermore, while not shown in FIG. 2, servicing engine 34 may include a number of other types of DFAs, such as bitmap only DFAs, array only DFAs, partial DFAs, fingerprint DFAs, or any other type of DFA. These other types of DFAs may be associated with application similar to hybrid DFAs 42. In any event, the techniques set forth in this disclosure should not be limited to example implementation of the techniques described herein with respect to FIG. 2.

In this manner, IDP device 14 may adapt the application of DFAs 42, and thus attack patterns, to different applications, which may enable IDP device 14 to more accurately apply these patterns to detect only those network attacks that target a particular protocol or application, while not detecting those that are harmless to each of the respectively identified protocols or applications. By selecting patterns according to identified applications, IDP device 14 may limit the consumption of system resources. After processing each of the packets of incoming traffic 36, servicing engine 34 may, based the application of one or more of DFAs 42, forward those packets as outgoing traffic, such as outgoing traffic 44.

Initially, an administrator or other network user, such as admin 31, may initially interact with IDP device 14 via a user interface presented by UI module 30 to configure servicing engine 34. In particular, administrator 31 may interact with this user interface presented by UI module 30 to define, edit or otherwise specify data defining DFA configuration parameters 46 ("DFA config parameters"). These parameters 46 may include parameters indicating percentages of available memory or other storage device dedicated to each of the plurality of hybrid DFAs 42, as well as, percentages defining an amount of the allocation of the memory dedicated to each of the plurality of hybrid DFAs 42 that is to be used for array DFA states 42A and bitmap DFA states 42B.

Thus, admin 31 may tailor the allocation of memory between the plurality of hybrid DFAs 42, as well as, partition the amount of this allocated memory between the two different array and bitmap implementations. This latter configuration may enable admin 31 to balance resource consumption with throughput consideration as allocating more memory to store array DFA states 42 may facilitate faster pattern matching but consume significantly more resources while allocating more memory to store bitmap DFA states 42B may improve resource consumption but reduce throughput as a result of increased memory access. Notably, such tailored memory management may enable admin 31 to tailor implementations of hybrid DFAs 42 to suite a spectrum of devices, including resource rich devices that include significant memory and computational resources and resource poor devices that provide limited memory and computational resources.

Admin 31 may also interact with the user interface presented by UI module 30 to define the sampling interval. Admin 31 may specify the sampling interval via this or another user interface by specifying data that defines one or more of sample triggers 48 for each of the plurality of hybrid DFAs 42. Each of sample triggers 48 may define a value (typically an integer value) that "triggers" or otherwise enables sampling when a corresponding one of traversal counters 50 equals the value defined by the respective one of sample triggers 48. Admin 31 may also specify through interactions with this or another user interface data defining a sample threshold 51. Sample threshold 51 may define a minimum number of samples required between dynamic promotion and demotion of the states of DFA 42, where sample counters 53 store the number of times a corresponding one of hybrid DFAs 42 have been sampled. After defining this sampling interval by specifying sample triggers 48 and sample threshold 51, admin 31 may interact with UI module 30 to enable or otherwise activate IDP device 14, wherein IDP device 14 may begin receiving packets as incoming traffic 36.

In response to receiving these packets, classifier module 32 may parse a five-tuple from each of the packets and perform a lookup in flow table 38 using the five-tuple as a key. If flow table 38 stores a flow entry that corresponds to the five-tuple, classifier module 32 may access this entry and determine an application identifier previously associated with the packet flow identified by the five-tuple extracted from the packet. Upon determining this application identifier, classifier module 32 may tag the packet with the application identifier and store the packet to one of queues 40. Servicing engine 34 may then "pop" or retrieve this packet from the queue along with the associated tag and select the one of hybrid DFAs 42 associated with the application identifier defined by the tag. Servicing engine 34 then traverses this one of hybrid DFAs 42 to apply one or more attack patterns to the packet. Based on the application of these patterns defined by this one of hybrid DFAs 42, servicing engine 34 may forward the packet as outgoing traffic 44 or take some other security action, such as dropping the packet or quarantining the packet.

However, if flow table 38 does not store an entry for the five-tuple extracted from the packet, classifier module 32 may invoke the above described AI module (again, not shown in FIG. 2) to process the packet so as to determine an application to which the packet corresponds. After classifying the packet to an application, classifier module 32 may associate the packet and, more particular, the packet flow with an application identifier that identifies the determined application in flow table 38 by defining a new entry to store this association.

In instances where the AI module fails to identify an application, the AI module may output a general application identifier. Classifier module 32, in this instance, takes one or more actions in response to this general application identifier. In one instance, classifier module 32 drops the packet. In other instances, classifier module 32 forwards the packet along a separate packet path within IDP device 14 that avoids application of any of patterns by way of hybrid DFAs 42. In yet other instances, classifier module 32 queues the packet with a tag identifying a default application which causes servicing engine 34 to traverse a default one of hybrid DFAs 42 so as to apply all of the patterns. In still other instances, classifier module 32 queues this packet with a tag identifying a default application that causes servicing engine 34 to traverse a default one of hybrid DFAs 42 to apply only a minimal subset of the full set of patterns.

Regardless of which one of hybrid DFAs 42 is applied, servicing engine 34 may monitor the traversal of hybrid DFAs 42 and update traversal counters 50. More particularly, servicing engine 34 may include a DFA manager module 52 that maintains sample triggers 48 and traversal counters 50 and updates traversal counters 50 to reflect application of a respective one of hybrid DFAs 42 to each packet. Generally, DFA manager module 52 represents hardware or a combination of hardware and software that manages the promotion of states from the bitmap implementation to the array implementation and the demotion of states from the array implementation to the bitmap implementation. DFA manager module 52 includes a promotion module 54 that represents a hardware or combination hardware and software that implements the promotion of states from the bitmap to the array implementation. DFA manager module 52 also includes a demotion module 56 that represents a hardware or combination hardware and software module that implements the demotion of states from the array to the bitmap implementation.

DFA manager module 52 may therefore update a respective one of traversal counters 50 that corresponds to one of hybrid DFAs 42 that servicing engine 34 is traversing to determine whether a current packet includes a pattern indicative of an attack. For example, servicing engine 34 traverses one of hybrid DFAs 42 by extracting symbols from a packet and traversing states 42A, 42B to reach a terminal node of this one of hybrid DFAs 42 that indicates either a pattern match or no match. While servicing engine 34 traverses this one of hybrid DFAs 42, DFA manager module 52 updates one of traversal counters 50 that stores an integer value reflective of the number or count of packets processed by this one of hybrid DFAs 42.

After updating one or more of traversal counters 50 in this manner, DFA manager module 52 then determines whether the updated ones of traversal counters 50 equal (or exceed) corresponding ones of sample triggers 48. If these updated ones of traversal counters 50 equal (or exceed) the corresponding ones of sample triggers 48, DFA manager module 52 may trigger or otherwise activate sampling. As one example, DFA manager module 52 performs this sampling by accessing the corresponding ones of hybrid DFAs 42 for which sampling was triggered and updating counters within those states that servicing engine 34 traversed when processing the current packet. That is, each of array DFA states 42A and bitmap DFA states 42B may be associated with a visit count that indicates an integer value reflective of the number of times each of these corresponding states have been visited or traversed by servicing engine 34 when processing packets. Notably, these visit counters are not updated each time servicing engine 34 traverses the corresponding state but only when sampling is triggered and therefore these visit counters are only statistically indicative of a number of traversals. In any event, when sampling is triggered, DFA manager module 52 increments, in this example, those visit counters associated with states 42A, 42B that servicing engine 34 traverses when processing the packet that caused the triggering.

After updating the visit counters in this manner, DFA manager module 52 may update a corresponding one of sample counters 53 to denote that the corresponding one of hybrid DFAs 42 has undergone sampling by DFA manager module 52. DFA manager module 52 then periodically, e.g., at a set or configurable interval of time, compares sample counters 53 to sample threshold 51 to determine whether to initiate the promotion/demotion of states 42A, 42B. As shown in FIG. 2, DFA manager module 52 includes a timer 58 that provides a configurable interrupt or other indication that the set or configurable amount of time has elapsed from the last timer interrupt or indication. In some instances, admin 31 interfaces with a user interface presented by UI module 30 to configure this timer 58. In other instances, DFA manager module 52 automatically configures timer 58 upon powering on and then adapt timer 58 to account for stabilization in the dynamic adaption of states 42A and 42B of hybrid DFAs 42 to particular flows of packets, where this adaption is described in more detail below.

In response to this timer interrupt, DFA manager module 52 may ensure that sample counters 53 equals or exceeds sample threshold 51. Initially, admin 31 may configure sample threshold 51 to a relatively small value to encourage sampling and the adaptive learning that occurs by way of updating visit counters associated with each of array DFA states 42A and bitmap DFA states 42B, which are described below in more detail. After learning stabilizes (e.g., the promotion and demotion of states is less frequent), admin 31 may set this sample threshold 51 to a relatively larger value to decrease overhead and associated resource utilization associated with performing the sampling on a more frequent basis. In some instances, DFA manager module 52 may automatically (e.g., without any further user or administrator intervention or interaction) increase sample threshold 51 as, for example, a function of set intervals or the frequency of promotions/demotions (where, as one example, less frequent promotions/demotions gives rise to a higher sample threshold value and more frequent promotions/demotions gives rise to a lower sample threshold value).

Assuming for purposes of illustration that a corresponding one of sample counters 53 equals or exceeds the respective one of sample thresholds 51, DFA manager module 52 may traverse each of array DFA states 42A and bitmap DFA states 42B and identify those of array DFA states 42A associated with low visit counts and those of bitmap DFA states 42B associated with high visit counts. DFA manager module 52 may then determine the memory budget, as defined in DFA configuration parameters 46 by way of the available memory allocated to the array implementation and the bitmap implementation of each of hybrid DFAs 42, for each of the array DFA states 42A and bitmap DFA states 42B. DFA manager module 52 may then compare this memory budget for each of the array DFA states 42A and bitmap DFA states 42B to the current amount of this budget consumed by array DFA states 42A and bitmap DFA states 42B. Based on this comparison, DFA manager module 52 may demote those of array DFA states 42A associated with a low visit count and/or promote those of bitmap DFA states 42B associated with a high visit count.

Assuming, as one example, that DFA manager module 52 determines that array DFA states 42A are only consuming a portion of the memory allocated for storing array DFA states 42A, DFA manager module 52 may only promote bitmap DFA states 42B without demoting any of array DFA states 42A. In particular, promotion module 54 may promote those of bitmap DFA states 42B associated with the highest visit counts until the memory budget for array DFA states 42A is entirely consumed or all of those bitmap DFA states 42B above a threshold visit count are promoted.

Assuming, as another example, that DFA manager module 52 determines that array DFA states 42A are consuming the entire memory budge allocated for storing array DFA states 42A, DFA manager module 52 may both demote those of array DFA states 42A associated with a low visit count to bitmap DFA states 42B and then promote bitmap DFA states 42B associated with a high visit count to array DFA states 42A. In this example, DFA manager module 42 may determine which of array DFA states 42A to promote by comparing the lowest visit counts associated with various ones of array DFA states 42A to the highest visit counts associated with various ones of bitmap DFA states 42B. If the visit counts associated with bitmap DFA states 42B, which is referred to as bitmap visit counts in this disclosure, equal and/or exceed the visit counts associated with array DFA states 42A, which may be referred to as array visit counts, DFA manager module 52 invokes demotion module 56 to demote any array DFA states 42A associated with a visit count that is less than the highest bitmap visit count associated with one or more of bitmap DFA states 42B. After demoting these array DFA states 42A, DFA manager module 52 may invoke promotion module 54 to promote those of bitmap DFA states 42B associated with the highest bitmap visit count.

DFA manager module 52 may continue in an iterative manner to demote and promote states 42A and 42B, so long as the memory budge for array DFA states 42A or bitmap DFA states 42B is exceeded. For example, DFA manager module 52 may compare the next highest bitmap visit count to the list of lower array visit counts and invoke demotion module 56 to demote any of array DFA states 42A associated with a visit count that is lower than the second or next highest bitmap visit count. DFA manager module 52 may then invoke promotion module 54 to promote those of bitmap DFA states 42B associated with the next highest (which after promoting those of bitmap DFA states 42B associated with the highest visit count may be considered the highest) visit count.

DFA manager module 52 may continue in this manner to dynamically adapt hybrid DFAs 42 to more efficiently service packets of incoming traffic 36, as the most frequently visited states are implemented as an array data structure to promote efficient processing of the most common attack patterns while at the same time reducing memory or storage unit consumption by storing less frequently visited states in the more memory efficient bitmap implementation. This dynamic adaption may periodically promote and demote states to account for changing packet flows and the fluctuations in attack patterns contained within the packets of these flows to better optimize hybrid DFAs 42 in efficiently processing the most frequently identified attack patterns without overly expanding the consumption of memory or unnecessarily storing redundant states as both array DFA states 42A and bitmap DFA states 42B.

While shown in FIG. 2 as comprising a plurality of hybrid DFAs 42, servicing engine 34 may implement the plurality of hybrid DFAs 42 as a single composite hybrid DFA, where the states for each of the plurality of hybrid DFAs 42 may follow in a linear fashion within the single composite hybrid DFA. In this implementation, the composite DFA may be indexed according to the application identifier described above to reach each of the logically distinct plurality of hybrid DFAs 42. The composite DFA may include a single budge or memory allotment for array DFA states 42A and bitmap DFA states 42B and DFA manager module 52 may promote and demote states from among the various plurality of hybrid DFAs 42.

In this implementation, DFA manager module 52 includes profiles 60 that configure the composite DFA so as to anticipate certain traffic flow characteristics and thereby improve servicing of these traffic flows. For example, DFA manager module 52 dynamically determines through statistical record keeping that, during certain times of each day, incoming traffic 36 mainly comprises email traffic. DFA manager module 52 then dynamically configures (or admin 31 may manually configure) one of profiles 60 such that DFA manager module 52 promotes those hybrid DFAs 42 associated with email applications to array DFA states 42A within the composite DFA prior to the determined times of each day to thereby anticipate this email traffic and better service incoming traffic 36. DFA manager module 52 stores data defining other profiles 60 that vary by day, time of day, day of the week, traffic rate (e.g., percent of total bandwidth consumed), and any other metric or characteristic that may facilitate application of attack patterns to incoming traffic 36.

Figure 3A:
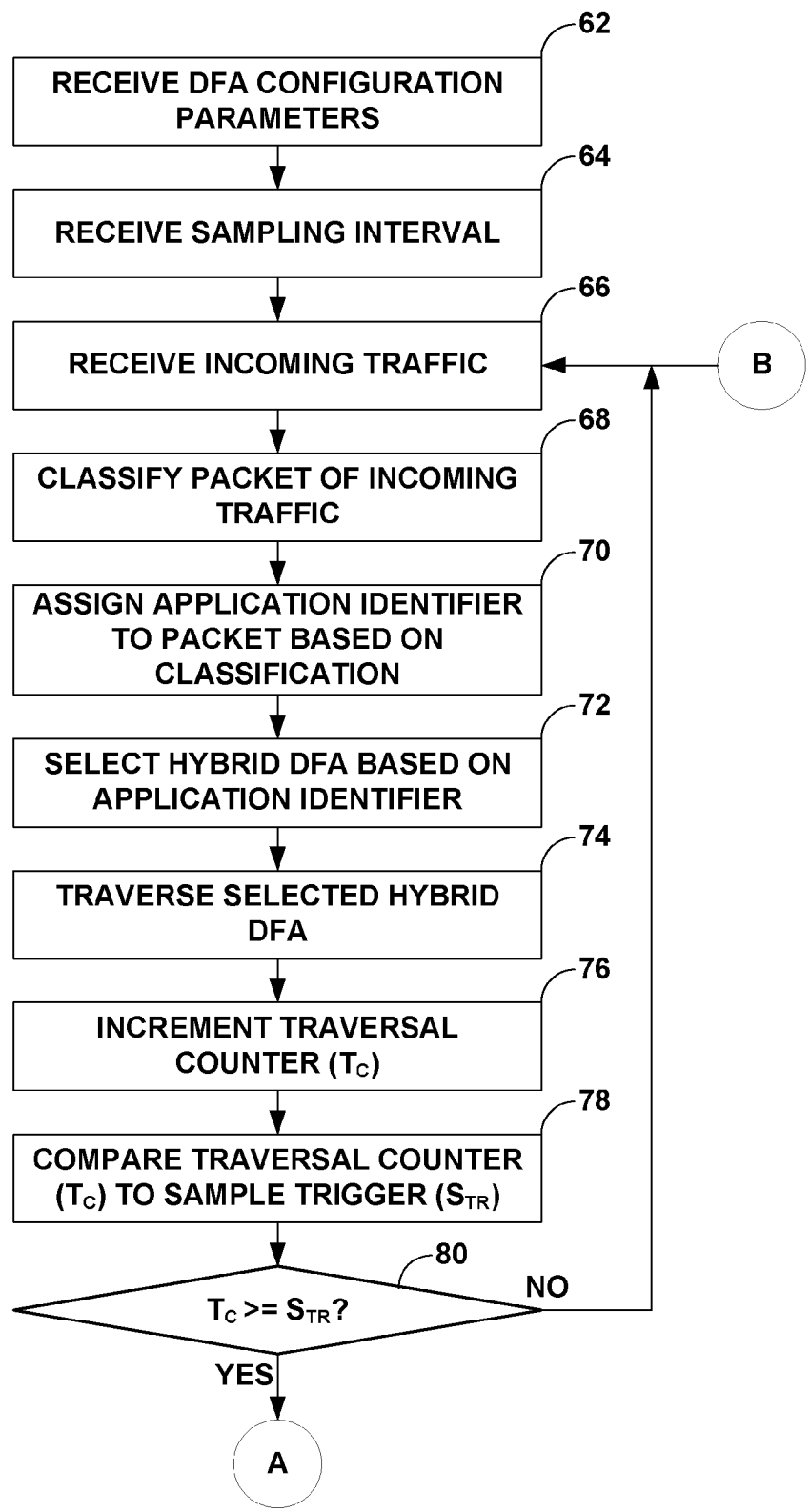
FIGS. 3A-3C are flowcharts illustrating example operation of an intermediate network device in implementing various aspect of the techniques described in this disclosure.
Figure 3B:
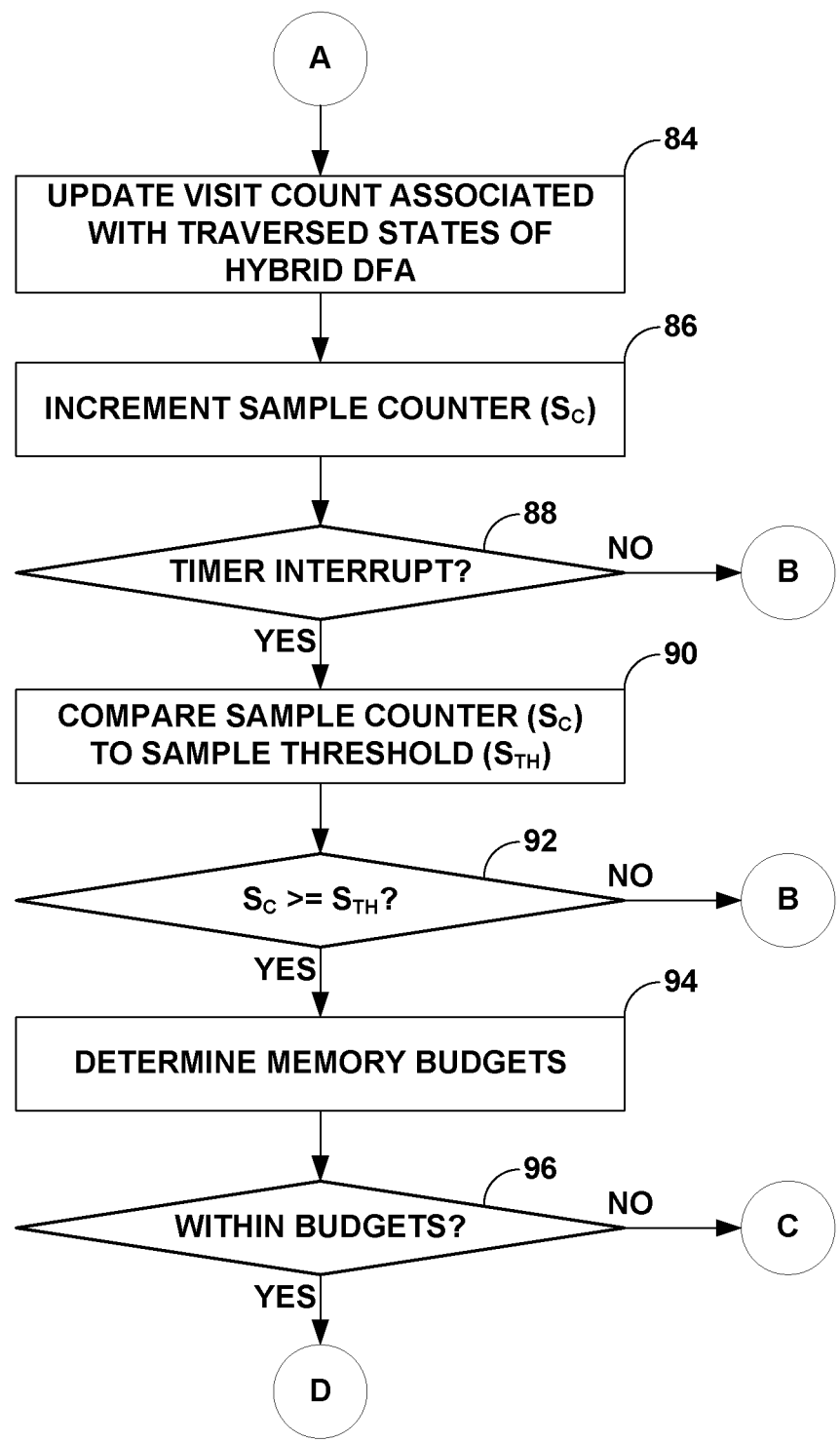
Figure 3C:
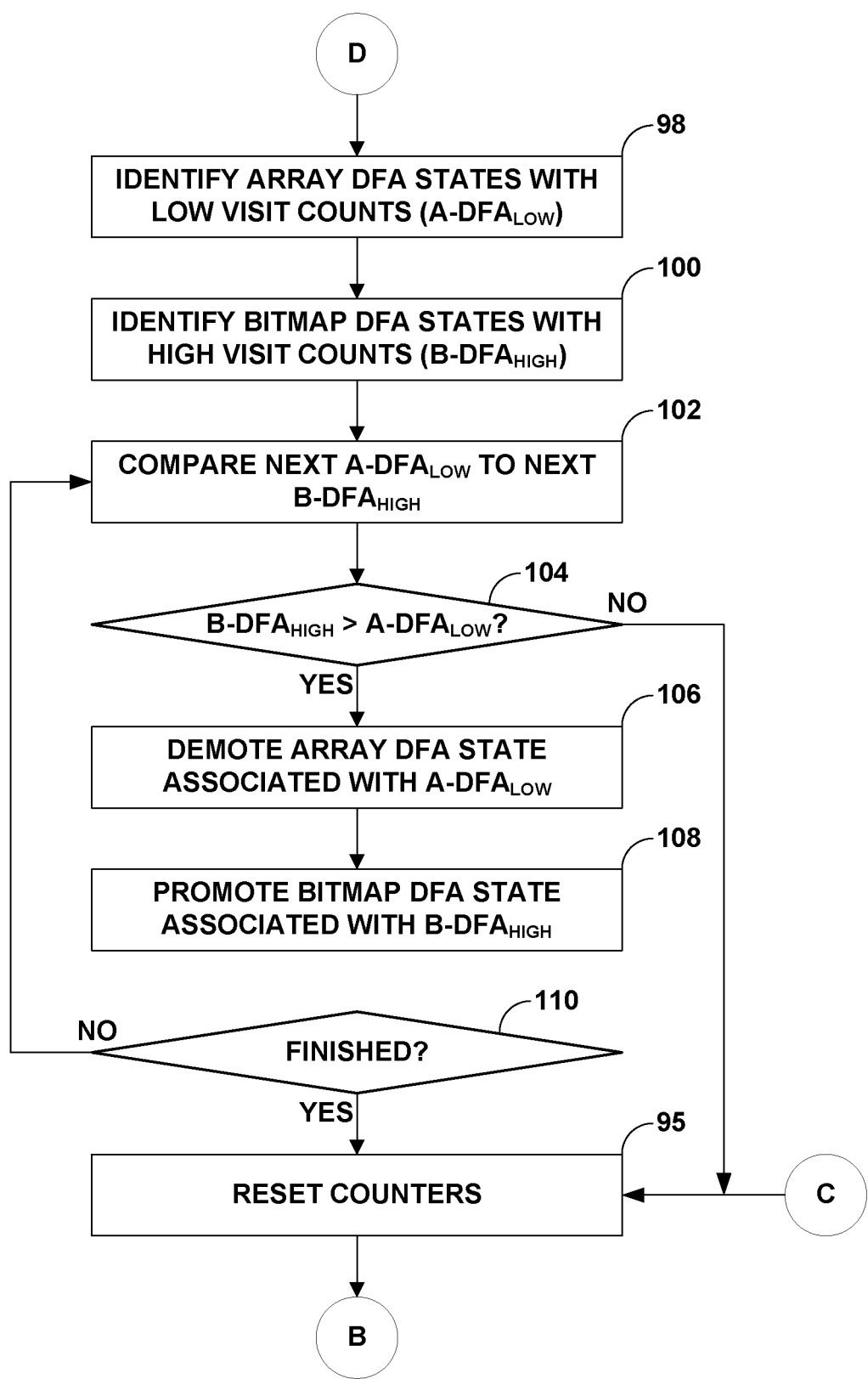

FIGS. 3A-3C are flowcharts illustrating example operation of an intermediate network device, such as IDP device 14 shown in FIG. 2, in implementing the techniques described in this disclosure to dynamically reallocate states within a hybrid DFA. Referring first to FIG. 3A, IDP device 14 receives DFA configuration parameters 46 from an administrator, such as admin 31, that specify a memory budget that defines a total percent or amount of memory allocated to array DFA states 42A and bitmap DFA states 42B within each of hybrid DFAs 42 (assuming separate implementations of DFAs 42 rather than the above described composite implementation having logically separate hybrid DFAs 42) in the manner described above (62). Admin 31 specifies DFA configuration parameters 46 via interaction with a user interface presented by UI module 30. Admin 31 may also specify a sampling interval via interaction with this or another user interface presented by UI module 30 by inputting data that defines one or more sample triggers 48, also as described above. Servicing engine 34 of IDP device 14 receives this sampling interval and update sample triggers 48 (64).

After configuring IDP device 14 in this manner, admin 31 enables IDP device 14 to begin receiving incoming traffic 36. IDP device 14 may then receive incoming traffic 36 and classify each packet of incoming traffic 36 in the manner described above (66, 68). Example IDP device 14 comprises a classifier module 32 by which to classify each of these packets of incoming traffic 36. Classifier module 32 maintains flow table 38 in the manner described above throughout this classification process and associates an application identifier with each unique packet flow. Classifier module 32 then classifies each of these packets by tagging or otherwise marking or associating each packet with an application identifier that identifies an application to which the packet flow, and thereby the packet, corresponds (70). Classifier module 32 stores each of the classified packets to one or more of queues 40.

Servicing engine 34 of IDP device 14 may, while classifier module 32 classifies packets, "pop" or otherwise retrieve these classified packets from queues 40. Servicing engine 34, upon retrieving these classified packets, selects one of hybrid DFAs 42 based on the application identifier associated with the retrieved packet, as described above (72). Servicing engine 34 traverses the selected one of hybrid DFAs 42 to apply those attack patterns associated with the identified application (74). Servicing engine 34 drops the packet or takes any other security action upon determining that this packet includes an attack pattern, as described by way of example above. Upon determining that the packet does not include one of the attack patterns, servicing engine 34 forwards the packet to its intended destination. While traversing the selected one of hybrid DFAs 42, DFA manager module 52 of servicing engine 34 updates a corresponding one of traversal counters 50, again as described above (72). DFA manager module 52, after updating the corresponding one of traversal counters 50, compares this traversal counter 50 to the corresponding one of sample triggers 48 to determine whether this traversal counter 50 is greater than or equal to the corresponding one of sample triggers 48 (78, 80).

If this traversal counter 50 is determined to be less than the corresponding one of sample triggers 48 ("NO" 80), IDP device 14 continues to receive incoming traffic 36, classify the packets of incoming traffic 36, apply the attack patterns by traversing one or more of hybrid DFAs 42 and increment traversal counters 50 until one or more of traversal counters 50 equals or exceeds the corresponding one or more of sample triggers 48 (66-80). If this traversal counter 50, however, is determined to be greater than or equal to the corresponding one of sample triggers 48, DFA manager module 52, referring to FIG. 3B, updates a visit counter associated with those states 42A, 42B of the selected one of hybrid DFAs 42 traversed by servicing engine 34, as described above (FIG. 3B, 84).

To illustrate, each of array DFA states 42A may comprise a data structure defined in the following exemplary pseudo-code:
 struct {
 u_int_16 next_state[256];
 u_int_32 visit_counter;
 }
In the above pseudo-code, each state is defined as a data structure or "struct" (or, more generally, object) that includes an array having 256 entries, where each entry comprises an unsigned integer of size 16-bits (or two bytes). Each entry defines an offset to a next state, hence the "next state" name of this array. This array state data structure also includes a 32-bit unsigned integer referred to as a visit counter or "visit counter." DFA manager module 42A accesses this visit counter for each state traversed by servicing engine 34 during this sampling interval and increment this visit counter by one.

Likewise, each of bitmap DFA states 42A may comprise a data structure defined in the following exemplary pseudo-code:

struct {
    u_int_8 bitmap[32];
    u_int_16*next_state;
    u_int_32 visit_counter;
    }

In this pseudo-code, each state is defined as a data structure or "struct" (or, more generally) object) that includes an array having 32 entries, where each entry comprises an unsigned integer of 8 bits (or one byte). Each bitmap data structure also includes a dynamically allocated "next_state" (where dynamic allocation is indicated by the star or asterisk "*"), which may, in terms of most programming language, comprise a pointer. In the above pseudo-code, the pointer is a 16-bit unsigned integer that "points" or otherwise references a memory address. This bitmap state data structure also includes a 32-bit unsigned integer referred to as a "visit counter" and DFA manager module 52 accesses this visit counter for each state traversed by servicing engine 34 during this sampling interval to increment the visit counter by one.

Once the sampling is complete, DFA manager module 52 updates or otherwise increments a corresponding one of sample counters 53 to reflect that the selected one of hybrid DFAS 42 was sampled in the manner described above (86). DFA manager module 52 may, if timer 58 does not trigger a timer interrupt ("NO" 88), continue to sample in this manner as IDP device 14 continues to receive incoming traffic 36 and service this traffic 36 until timer 58 issues a timer interrupt (66-86). Once timer 58 issues a timer interrupt ("YES" 88), DFA manager module 52 then compares sample counters 53 to sample threshold 51 to determine whether sample counters 53 are greater than or equal to sample threshold 51 (90, 92). For those of sample counters 53 determined to be less than sample threshold 51 ("NO" 92), DFA manager module 52 may not perform the techniques described herein to dynamically reallocate states within those corresponding ones of hybrid DFAs 42. Instead, IDP device 14 continues to receive traffic 36 and service this traffic 36 in the manner described above (66-90).

However, for those of sample counters 53 that are determined to be greater than or equal to sample threshold 51 ("YES" 92), DFA manager module 52 determines from DFA configuration parameters 46 the memory budgets associated with these ones of hybrid DFAs 42, as described above (94). DFA manager module 52 then compares these memory budgets to a current consumption of memory by each of array DFA states 42A and bitmap DFA states 42B of these hybrid DFAs 42 in order to determine whether these states 42A, 42B are within these memory budges (96). If not within the memory budgets, IDP device 14 resets the various counters (referring to FIG. 3C), as described below in more detail, and then continue to receive and service incoming traffic 36 in the manner described above (95, 66-94). To illustrate, if the memory budget for one of DFAs 42 is equal to the amount of memory required to store all of the states of this one of DFAs 42 as bitmap states, DFA manager module determines that the allocated memory does not enable decompression of bitmap states to array states and may not perform the promotion/demotion process.

Yet, if the current consumption of memory is within the memory budges, DFA manager module 52, referring now to FIG. 3C, traverse each of these hybrid DFAs 42 identifies those of array DFA states 42A associated with the lowest visit counts as defined by the respective visit counters (98). DFA manager module 52 generates an array list of these states that is ordered from lowest visit count to highest visit count. DFA manager module 52 may limit this list to a set number of entries, such as ten entries, to reduce overhead through application of a global frequency threshold (not shown in FIG. 2). DFA manager module 52 also identifies those of bitmap DFA states 42B associated with the highest visit counts as defined by the respective visit counters (98). DFA manager module 52 generates a bitmap list of these states that is ordered from highest visit count to lowest visit count. DFA manager modules 52 limits this list to a set number of entries, such as ten entries, to reduce overhead through application of a global frequency threshold (not shown in FIG. 2).

After forming, creating or otherwise generating these lists, DFA manager module 52 proceeds to compare the lowest visit count in the array list to the highest count in the bitmap list to determine whether the highest bitmap visit count is greater than the lowest array visit count (102, 104). If the lowest array visit count in the array list is not less than the highest bitmap visit count in the bitmap list ("NO" 104), DFA manager module 52 may not promote or demote any of states 42A, 42B. Instead, DFA manager module 52 resets the visit counters associated with each of states 42A, 42B of this one of hybrid DFAs 42 and resets the one of sample counters 52 and traversal counters 50 associated with this one of hybrid DFAs 42, again as described above (95). IDP device 14 continues to receive and service network traffic 36 in the manner described above (66-104).

If the lowest array visit count in the array list is less than the highest bitmap visit count in the bitmap list ("YES" 104), DFA manager module 52 invokes demotion module 56 to demote the one of arrays DFA states 42A associated with the lowest visit count, as described above (106). DFA manager module 52 then invokes promotion module 54 to promote the one of bitmap DFA states 42B associated with the highest visit count, as described above (108). DFA manager module 52 removes these entries from each of the array and bitmap lists and determine whether the demotion/promotion process is finished, e.g. whether the array and bitmap lists include any further entries (110). If not finished ("NO" 110), DFA manager module 52 compares the next lowest array visit count, which may be the first entry on the array list due to the removal of the lowest entry, to the next highest bitmap visit count, which may be the first entry on the bitmap list due to the removal of the highest entry, and continue in the above described manner to promote or demote these states or exit the promotion or demotion process (104-110). Regardless, once finished or upon exiting this promotion/demotion process, DFA manager module 52 resets the counter in the manner described above (95).

IDP device 14, once again, continue in this manner to receive and service incoming traffic 36 while maintaining hybrid DFAs 42 in accordance with the dynamic reallocation techniques set forth in this disclosure. As noted above, the dynamic reallocation techniques of this disclosure may facilitate the application of attack patterns or any other pattern matching by adapting hybrid DFAs in near, if not actual, real-time to accommodate a changing profile of attack patterns. In some instances, DFA manager module 52 may even include profiles 60 so as to anticipate these changing attack pattern profiles, as described above.

The techniques of this disclosure therefore provide one or more potential benefits. For example, the techniques potentially enable a dynamic hybrid DFA that has states that can be dynamically compressed (e.g., through demotion of array states to a bitmap implementation) and uncompressed (e.g., through promotion of bitmap states to an array implementation) based on the "usage" or visit counts of these states. The techniques also provide for a global frequency threshold that may be dynamically derived from one or more memory budgets and which may be used to control which states should be compressed. In other words, the techniques in some instances enable a threshold by which to compare visit counts to determine whether these visit counts should be placed on the respect array and bitmap lists described above.

The techniques also potentially promote memory efficiency by storing compressed (e.g., bitmap states) alongside of uncompressed (e.g., array states) in the same one of hybrid DFAs 42. This promotes memory efficiency in that this data structure, whereby both states can be stored in the same DFA, do not need to include any redundant states (e.g., the same state implemented as both an array state and a bitmap state). In other words, this data structure does not provide any separation between the front end and back end matching (e.g., another back end DFA of bitmap states is not needed as the data structure of hybrid DFAs 42 co-locate the states in the same DFA, contrary to convention hybrid DFAs). The techniques further potentially maximize overall pattern matching performance of each of hybrid DFAs 42 within a given memory budget in that the techniques enable detailed configuration of DFAs 42 while also providing adaptive or dynamic learning to promote/demote states to achieve possibly an optimal matching efficiency in terms of computational performance.

Figure 4A:
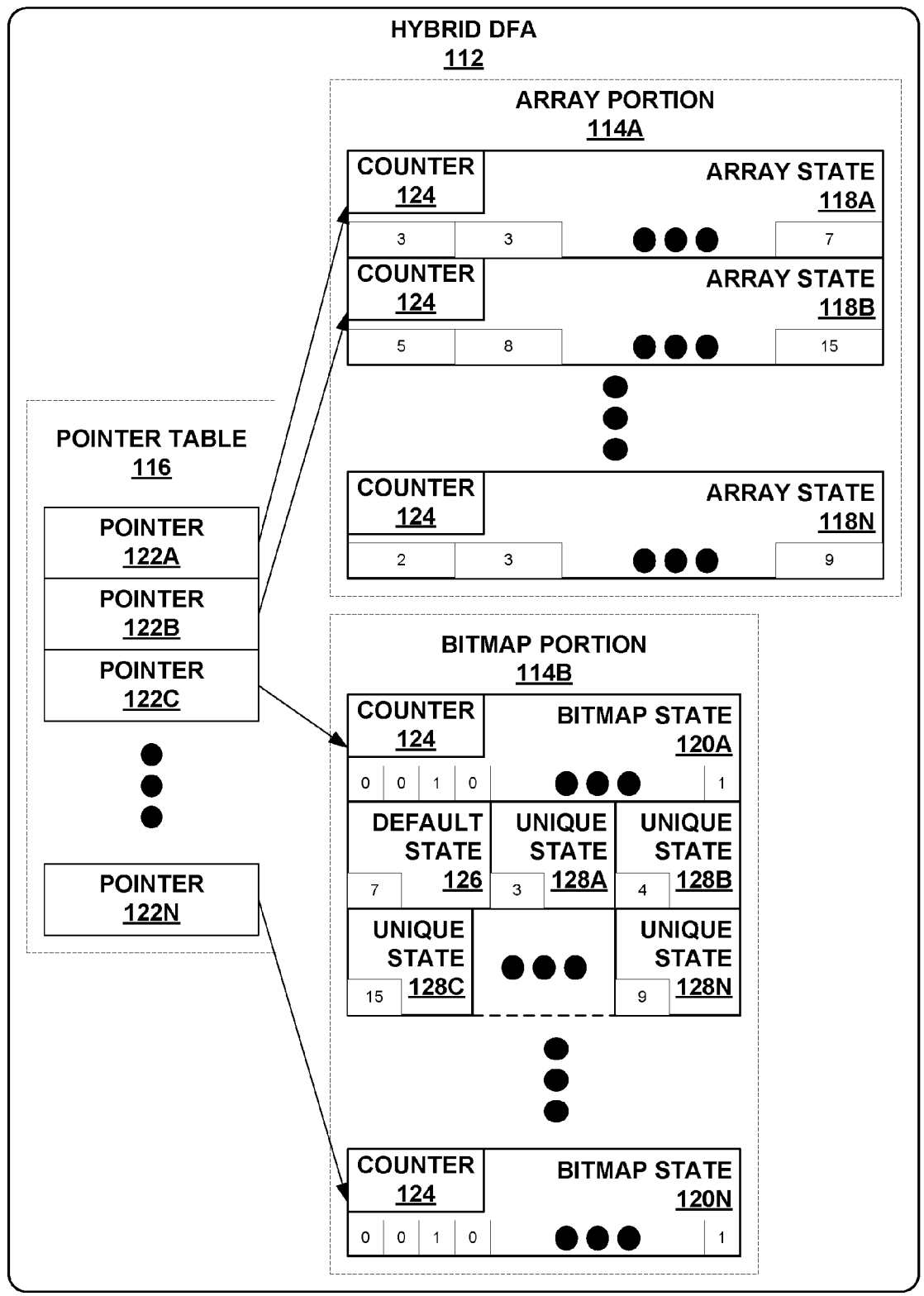
FIGS. 4A-4D are block diagrams illustrating an exemplary hybrid Deterministic Finite Automata (DFA) undergoing dynamic reallocation in accordance with the techniques described in this disclosure.

FIGS. 4A-4D are block diagrams illustrating an exemplary hybrid Deterministic Finite Automata (DFA) 112 undergoing dynamic reconfiguration and reallocation in accordance with the techniques described in this disclosure. FIG. 4A is a block diagram illustrating hybrid DFA 112 at a first point in time prior to a dynamic reallocation of states between an array portion 114A and a bitmap portion 114B of hybrid DFA 112. As shown in FIG. 4A, hybrid DFA 112 represents a graph of interconnected states using a pointer table 116 and previously mentioned array portion 114A and bitmap portion 114B. Array portion 114A includes a plurality of array states 118A-118N ("array states 118"). Bitmap portion 114B includes a plurality of bitmap states 120A-120N ("bitmap states 120"). Pointer table 116 includes a plurality of pointers 122A-122N ("pointers 122"), each of which references or "points to" (hence the name "pointers") a memory address that stores a different one of array states 118 or bitmap states 120.

Each of array states 118 represents, as one example, an array DFA data structure (e.g., a row within a table) that has been instantiated in memory to represent an individual DFA state. The underlying array DFA data structure (e.g., individual row) may contain a counter variable, which is typically an unsigned integer variable, and a plurality of integer variables, each of which stores an offset into pointer table 116 and thereby references one of pointers 122. When instantiated, each of array states 118 include a counter 124 and a plurality of array entries that represent offset integers, which are shown in FIGS. 4A-4D as blocks including an integer offset value. For example, array state 118B includes counter 124 and entries defining offset integer values of 5, 8 and 15. Each of the offset integers may be associated with a one-byte ASCII character (which are not shown in FIGS. 4A-4D) for ease of illustration purposes. Consequently, array states 118 may each comprise 256 two-byte entries associating each of the 256 ASCII one-byte characters to the plurality of offset integers entries shown in FIG. 4A for a total of 512 bytes plus overhead (e.g., counter 124) to store each of array states 118.

Each of bitmap states 120 represents instantiated bitmap DFA data structures. The underlying bitmap DFA data structure comprises a counter variable similar to the underlying array data structure and a bitmap. The bitmap is shown in FIG. 4 as a series of blocks storing either a "1" or a "0." The underlying bitmap DFA data structure also comprises a default state 126 and a plurality of unique states 128A-128N. Notably, only bitmap state 120A has been expanded in FIGS. 4A-4D to show default state 126 and unique states 128A-128N for purposes of illustration. However, each of bitmap states 120 may be substantially similar bitmap state 120A shown in FIGS. 4A-4D.

In any event, default state 128 comprises a single entry associating a one-byte ASCII character (not shown in FIGS. 4A-4D for ease of illustration) to an offset integer. For example, default sate 126 includes an entry denoted by the offset integer of 7, which as described above may indicate an offset into pointer table 116. Each of unique states 128 defines a unique state that associates a single one-byte character with an offset integer.

As described above, bitmap states 120 represents one example of a compressed form of array states 118. To illustrate, bitmap state 120A comprises a bitmap of "0, 0, 1, 0 . . . 1." Each zero or "0" in the bitmap denotes the default state and causes a traversal to default state 126. Considering that many input symbols, e.g., a portion or 1-byte character of a packet payload currently being analyzed, do not match any characters of an attack pattern, there is much redundancy in the DFA whereby many of the states of a DFA reference the same next state when a symbol does not match an attack pattern for which a network device, such as IDP 14 of FIG. 1, is currently attempting to detect. As a result, many entries associate a different two-byte ASCII character with the same next state (e.g., offset integer identifying the next state). Consequently, these redundant associations are potentially compressed using the bitmap and default state 126, thereby possibly significantly reducing the size of each state in the DFA.

However, each time one of bitmap states 120 is accessed, the bitmap must first be accessed followed by an access of either one of default state 126 or a corresponding one of unique states 128, which consumes significantly more operations than accessing an entry of one of array states 118. Unique states 128 are accessed based on the index of the accessed bitmap entry. For example, to access unique state 128A, IDP device 14 computes the address of unique state 128A based on the index of the first one "1" in the bitmap (which equals two considering the first entry of the bitmap has an index of zero and the second entry of the bitmap has an index of one). To compute the address, IDP 14, for each entry storing a "1," accesses a mathematical function that takes the index of the accessed entry as an input and outputs an address to one of unique states 128.

As described above, IDP device 14 and, more particularly, DFA manager module 52 updates counters 124 in response to a triggered sampling interval defined by sample triggers 48 and sample counters 53. Periodically, DFA manager module 52 then evaluates counters 124 of array states 118 in comparison to counters 124 of bitmap states 120. If any of counters 124 of array states 118 store a count that is less than the greatest count stored to counters 124 of bitmap states 120, demotion module 56 of DFA manager module 52 demotes those of array states 118 having counters 124 that define counts less than the greatest count stored to counter 124 of bitmap states 120. Likewise, promotion module 54 of DFA manager module 52 promotes the one of bitmap states 120 having counter 124 that currently stores the greatest count. This evaluation may continue in this manner with respect to the next greatest count stored by a counter 24 of the one of bitmap states 120 until the amount of memory allocated for array DFA states 118 is consumed. For purposes of illustration it is assumed below that DFA manager module 52 determined to demote array state 118B and promote bitmap state 120A in accordance with the techniques described above.

Figure 4B:
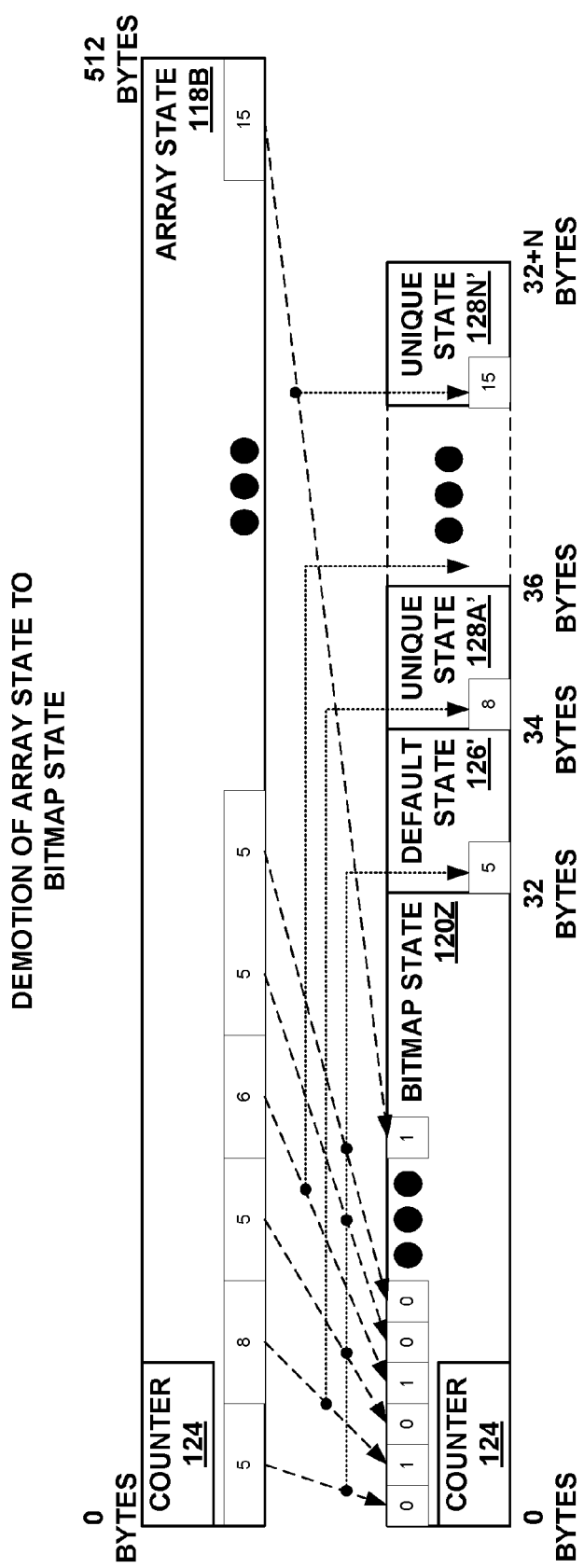

FIG. 4B is a block diagram illustrating a demotion of array state 118B and generation of a new, corresponding bitmap state 120Z as one example of the techniques described in this disclosure. In the example of FIG. 4B, array state 118B is shown in expanded form to have entries of associating one-byte ASCII characters to the offset integers of 5, 8, 5, 6, 5, 5 and 15. Demotion module 56 demotes array state 118B by first creating a new bitmap state 120Z and mapping the entries of array state 118B to a bitmap of bitmap state 120Z. This mapping involves determining a default state 126' and unique states 128A'-128N' though analysis of the frequency of associations with offset integers in array state 118B. In the example of FIG. 4B, it is assumed that an offset integer of 5 is associated with the most, by percentage for example, of the one-byte ASCII characters in all of the entries of array state 118B. Consequently, demotion module 56 sets the sole entry of default state 126 to an offset integer of five.

For all of the less (again, in terms of percentages as one example) frequently associated integer offsets, demotion module 56 dynamically generates a unique state for each of the other less frequent integer offsets and specify, during the dynamic instantiation of these unique states 128A'-128N', the unique or less frequent integer offsets. To illustrate, considering that associations with an integer offset of 5 is most frequent, demotion module 56 instantiates a unique state 128A' to include an entry identifying an integer offset of 8. The derivations of default state 126' and unique states 128A'-128N' are shown in FIG. 4B by the dashed line, which shows the derivation of the bitmap, and the dotted line, which shows the derivation of state 126' and 128A'-128N'. To derive the bitmap, demotion module 56 assigns a zero in the bitmap to denote the corresponding entry in array state 118B is associated with the default integer offset of 5 and a one in the bitmap to denote the corresponding entry in the array state 118B is associated with one of unique states 128A'-128N'. Demotion module 56 next derives the mathematical formula by which to access unique states 128A'-128N' given an index in the bitmap and store this formula to new bitmap state 120Z. After generating new bitmap state 120Z in this manner, demotion module 56 returns new bitmap state 120Z to DFA manager module 52.

Figure 4C:
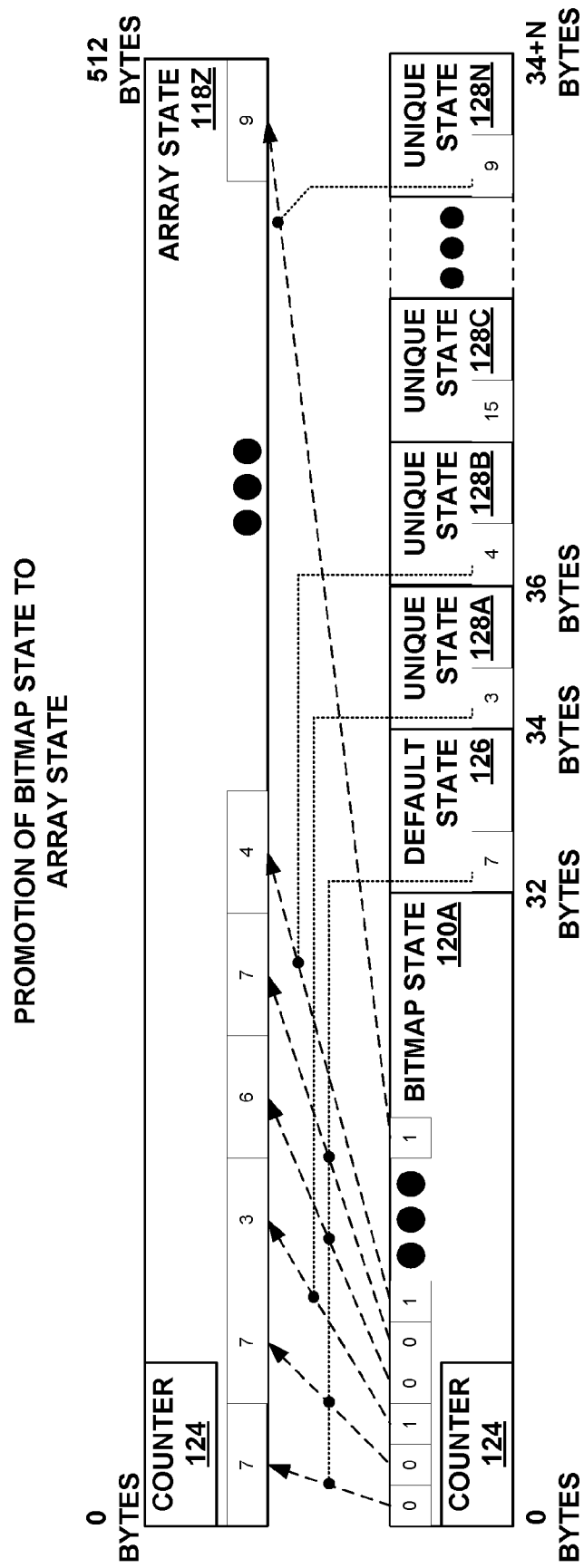

FIG. 4C is a block diagram illustrating an exemplary promotion of bitmap state 120A to a new array state 118Z in accordance with the techniques described in this disclosure. In the example of FIG. 4C, DFA manager module 52 passes bitmap state 120A to promotion module 54, whereupon promotion module 54 creates new array state 118Z by instantiating the above described array data structure. Promotion module 54 then converts the bitmap of bitmap state 120A into an array of entries. To perform this conversion, promotion module 54 converts each "0" in the bitmap to an array state entry by setting the offset integer of the entry in the array to the offset integer of "7" defined by default state 126. For example, promotion module 54 identifies the first zero of the bitmap having an index in the bitmap of zero and sets the entry in the array having the same index of zero to the integer offset of seven defined by default state 126.

For each "1" in the bitmap, promotion module 54 sets the integer offset of the entry in the array of array state 118Z having the same index as that of the located "1" in the bitmap to the integer offset defined by the unique state 128A located using the index of the located "1" in the bitmap. For example, promotion module 54 locates the first "1" in the bitmap at an index of two in the bitmap and enter this index of two into a mathematical formula to locate unique state 128A defining an integer offset of three. Promotion module 54 then sets the integer offset of the entry in the array of array state 118Z having the same index of two to the located integer offset of three defined by unique state 128A. Promotion module 54 continues in this manner to covert each of the bits of the bitmap into array entries so as to promote bitmap state 120A to array state 118Z. The arrows shown in FIG. 4C depict the conversion and interrelation between the bitmap and states 126 and 128A-128N.

After promoting bitmap state 120A in this manner, promotion module 54 returns array state 118Z to DFA manager module 52. DFA manager module 52 then deletes array state 118B and bitmap state 120A from array portion 114A and bitmap portion 114B, respectively, and inserts array state 118Z and bitmap state 120Z into array portion 114A and bitmap portion 114B, respectively. DFA manager module 52 then redirects pointers 122B and 122C to point to these new states 118Z and 120Z, respectively.

Figure 4D:
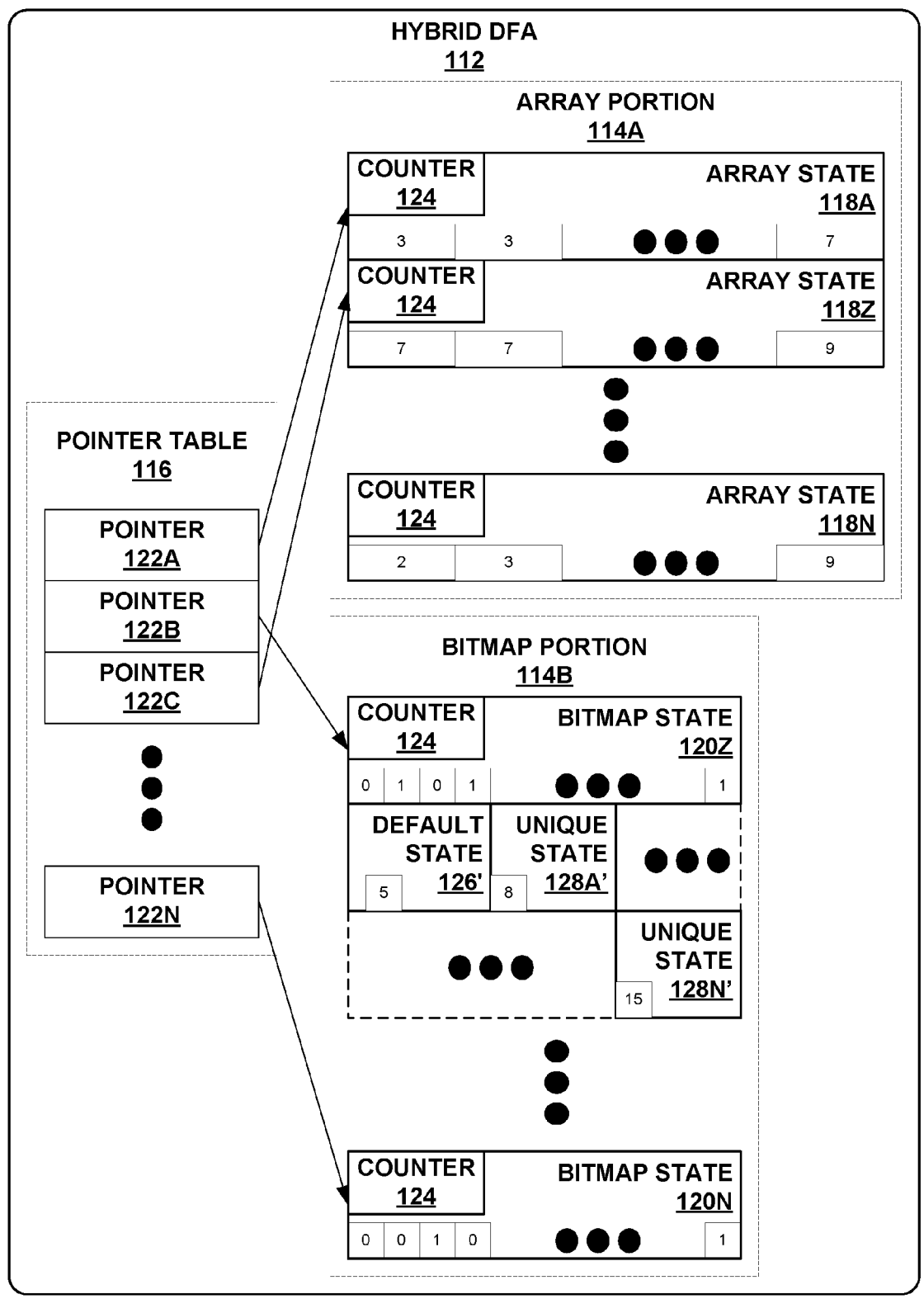

FIG. 4D is a block diagram illustrating the resulting structure of hybrid DFA 112 after demoting array state 118B and promoting bitmap state 120A in accordance with the techniques set forth in this disclosure. As shown in the example of FIG. 4D, array portion 114A includes array state 118Z, which is the new array state resulting from the promotion of bitmap state 120A. Likewise, bitmap portion 114B includes bitmap state 120Z, which is the new bitmap state resulting from the promotion of array state 118B. Notably, DFA manager module 52 has deleted array state 118B and bitmap state 120A and inserted array state 118Z and bitmap state 120Z in place of these deleted array state 118B and bitmap state 120A. While shown as replacing these state, DFA manager module 52 may not replace these states in a manner such that each of array state 118Z and bitmap state 120Z resides at the same memory location of deleted array state 118B and bitmap state 120A. Replacement of states may be particularly difficult with respect to bitmap states, as unique states 128 of bitmap states are dynamically allocated and as a result the size of bitmap states may fluctuate such that bitmap state 120Z typically does not consume the same amount of memory as bitmap sate 120A.

In any event, DFA manager module 52 has redirected pointer 122B to reference bitmap state 120Z and pointer 122C to reference array state 118Z. By using pointers in this manner, DFA manager module 52 need not update offset integers into pointer table 116, but instead redirects pointers 122 to reference the new promoted or demoted version of the same state.

While described in this disclosure with respect to an exemplary hybrid DFA, the techniques may be applied to any type of state machine (SM) including finite SMs (FSMs), such as nondeterministic finite automata (NFA). In the same way, while described with respect to particular implementations of various portions of the hybrid DFA, e.g., bitmap and array implementations, the techniques may apply to any SM having two or more portions implemented by way of two or more different implementations, where the two or more different implementation provide various tradeoffs in terms of processor and memory utilization/efficiency. Moreover, although described herein with respect to network devices, the techniques may be implemented by any device that performs pattern matching using SMs. In this respect, the techniques may be implemented by any type of computing or other device to facilitate pattern matching with respect to any type of data, including network traffic (e.g., packets), files or other forms, formats, or, more generally, types of input data. The techniques therefore should not be limited in any of the above identified respects but may apply generally to any device capable of performing pattern matching on data using a SM having two or more different implementations, where each of these implementation provide various tradeoffs in terms of processor and memory utilization, consumption and/or efficiency.

Various embodiments of the invention have been described. These and other embodiments are within the scope of the following claims.

The invention claimed is:

1. A method comprising:
    processing network packets with a network device using a hybrid deterministic finite automata (DFA) having a first set of states in a first portion of the DFA in an uncompressed format and a second set of states in a second portion of the hybrid DFA in a compressed format to traverse the first set of states and the second set of states of the hybrid DFA;
    when processing the network packets, comparing, with the network device, a number of times one or more of the first set of states and one or more of the second sets of states have been traversed by the network device and dynamically reallocating the first set of states of the first portion of the hybrid DFA in the uncompressed format and the second set of states of the second portion of the hybrid DFA in the compressed format based on the comparison by at least in part:
        converting at least one of the first set of states of the first portion of the hybrid DFA to generate a corresponding state in the compressed format,
        converting at least one of the second set of states of the second portion of the hybrid DFA to generate a corresponding state in the uncompressed format,
        deleting the at least one of the first set of states,
        deleting the at least one of the second set of states,
        adding the corresponding state in the compressed format to the second portion of the hybrid DFA, and
        adding the corresponding state in the uncompressed format to the first portion of the hybrid DFA.

2. The method of claim 1,
    wherein each of the first set of states and the second set of states include a counter to keep a count of the number of times each of the respective first set of states and the second set of states have been traversed by the network device when processing the packets,
    wherein comparing a number of times one or more of the first set of states and one or more of the second sets of states have been traversed by the network device comprises comparing the counters of each of the first set of states and to the counters of each of the second set of states to determine those of the first set of states that include counters defining counts less than the counts defined by the counters included within at least one of the second set of states, and
    wherein dynamically reallocating comprises:
        converting at least one of the first set of states of the first portion of the DFA to generate a corresponding state in the compressed format, deleting the at least one of the first set of states, and adding the corresponding state in the compressed format to the second portion of the DFA when the at least one of the first set of states is determined to include one of the counters defining one of the counts that is less than one of the counts defined by one of the counters of the at least one of the second set of states; and
        converting at least one of the second set of states of the second portion of the DFA to generate a corresponding state in the uncompressed format, deleting the at least one of the second set of states, and adding the corresponding state in the uncompressed format to the first portion of the DFA when the at least one of the second set of states is determined to include one of the counters defining one of the counts that are greater than one of the counts defined by one of the counters of the first set of states.

3. The method of claim 1,
    wherein the first portion of the hybrid DFA comprises an array portion of the hybrid DFA that includes, as the first set of states of the hybrid DFA, array states implemented in accordance with an array DFA implementation,
    wherein the second portion of the hybrid DFA comprises a bitmap portion of the hybrid DFA that includes, as the second set of states of the DFA, bitmap states implemented in accordance with a bitmap DFA implementation.

4. The method of claim 1, further comprising storing a list of pointers that reference the first set of states and the second set of states, wherein each of the pointers references a different one of the first set of states and the second set of states,
    wherein dynamically reallocating one or more of the first set of states and one or more of the second set of states between the first and second portions of the hybrid DFA comprises updating those of the pointers that reference the reallocated one or more of the first set of states and the one or more of the second set of states to reflect the reallocation of the reallocated one or more of the first set of states and the one or more of the second set of states between the first and second portions of the hybrid DFA.

5. The method of claim 1, wherein each of the first set of states and the second set of states include a counter to keep a count of the number of times each of the respective first set of states and the second set of states have been traversed,
    the method further comprising determining the number of times the first set of states and one or more of the second sets of states have been traversed by the network device in accordance with a sampling interval, wherein the sampling interval defines a number of the packets that need be processed by the network device before updating one of the counters of the first set of states and the second set of states currently being traversed.

6. The method of claim 5, further comprising resetting the counters after dynamically reallocating the one or more of the first set of states and the one or more of the second set of states between the first and second portions of the hybrid DFA based on the comparison.

7. The method of claim 1, wherein comparing a number of times one or more of the first set of states and one or more of the second sets of states have been traversed comprises periodically comparing the number of times one or more of the first set of states and one or more of the second sets of states have been traversed by the network device.

8. The method of claim 1, wherein the network device comprises an intrusion detection and prevention (IDP) device, and wherein processing the packets comprises processing one or more symbols to traverse the hybrid DFA so as to detect one or more attack patterns included within the one or more packets.

9. The method of claim 1,
wherein the network device comprises an intrusion detection prevention (IDP) device, and
wherein the method further comprises:
receiving, with the IDP device, the packets;
parsing the packets to identify one or more symbols within a payload of each of the packets;
processing the one or more symbols to traverse the hybrid DFA so as to detect one or more attack patterns included within the one or more packets;
performing a security action in response to detecting the one or more attack patterns, wherein the security action comprises one of quarantining those of the packets that include the detected attack pattern, dropping those of the packets that include the detected attack pattern, and blocking a flow associated with those of the packets that include the detected attack pattern.

10. The method of claim 1,
wherein the first portion of the hybrid DFA comprises an array portion of the hybrid DFA that includes, as the first set of states of the hybrid DFA, array states implemented in accordance with an array DFA implementation,
wherein storing first data comprises storing the first data so as to define the array portion of the hybrid DFA,
wherein the second portion of the hybrid DFA comprises a bitmap portion of the hybrid DFA that includes, as the second set of states of the hybrid DFA, bitmap states implemented in accordance with a bitmap DFA implementation, and
wherein storing second data comprises storing the second data so as to define the bitmap portion of the hybrid DFA.

11. The method of claim 10,
wherein each of the array states comprises an array of array entries, each of the array entries corresponding to a different symbol of a plurality of symbols extracted from the packets, wherein each of the array entries store a reference to one or more of an attack signature and a next state of the hybrid DFA or indicate that no attack signature is present in one of the network packets currently being processed, and
wherein each of the bitmap states comprises a bitmap and a default state and one or more dynamically allocated unique states, wherein the bitmap comprises a number of bitmap entries that each reference either the default state or one of the one or more dynamically allocated unique states, wherein each of the default state and the one or more dynamically allocated unique states store a reference to one or more of another attack signature and another next state of the hybrid DFA or indicate that no attack signature is present in one of the network packets currently being processed.

12. The method of claim 1, further comprising:
storing the first portion of the hybrid DFA in the uncompressed format to a memory; and
storing the second portion of the hybrid DFA in the compressed format to the same memory.

13. The method of claim 12, wherein dynamically reallocating the first set of states of the first portion of the hybrid DFA in the uncompressed format and the second set of states of the second portion of the hybrid DFA in the compressed format comprises:
determining a first memory budget for the first portion of the hybrid DFA in the uncompressed format that identifies an amount of the memory to be consumed when storing the first portion of the hybrid DFA in the uncompressed format;
determining a second memory budget for the second portion of the hybrid DFA in the compressed format that identifies an amount of the memory to be consumed when storing the second portion of the hybrid DFA in the compressed format; and
dynamically reallocating the first set of states of the first portion of the hybrid DFA in the uncompressed format and the second set of states of the second portion of the hybrid DFA in the compressed format based on the comparison and at least one of the first memory budget and the second memory budget.

14. The method of claim 1, wherein none of the first set of states in the first portion of the DFA are duplicates of the second set of states in the second portion of the DFA when processing the network packets.

15. A network device comprising:
at least one interface that receives incoming network traffic comprising network packets; and
a control unit that processes the network packets using a hybrid deterministic finite automata (DFA) having a first set of states in a first portion of the hybrid DFA in an uncompressed format and a second set of states in a second portion of the hybrid DFA in a compressed format to traverse the first set of states and the second set of states of the hybrid DFA and, when processing the network packets, compares a number of times one or more of the first set of states and one or more of the second sets of states have been traversed and dynamically reallocates the first set of states of the first portion of the hybrid DFA in the uncompressed format and the second set of states of the second portion of the hybrid DFA in the compressed format based on the comparison by, at least in part, converting at least one of the first set of states of the first portion of the hybrid DFA to generate a corresponding state in the compressed format, converting at least one of the second set of states of the second portion of the hybrid DFA to generate a corresponding state in the uncompressed format, deleting the at least one of the first set of states, deleting the at least one of the second set of states, adding the corresponding state in the compressed format to the second portion of the hybrid DFA, and adding the corresponding state in the uncompressed format to the first portion of the hybrid DFA.

16. The network device of claim 15,
wherein each of the first set of states and the second set of states include a counter to keep a count of the number of times each of the respective first set of states and the second set of states have been traversed by the network device when processing the packets,
wherein the control unit comprises a servicing engine that includes a manager module that compares the counters of each of the first set of states and to the counters of each of the second set of states to determine those of the first set of states that include counters defining counts less than the counts defined by the counters included within at least one of the second set of states,
wherein the manager module converts at least one of the first set of states of the first portion of the DFA to generate a corresponding state in the compressed format, deletes the at least one of the first set of states, and adds the corresponding state in the compressed format to the second portion of the DFA when the at least one of the first set of states is determined to include one of the counters defining one of the counts that is less than one of the counts defined by one of the counters of the at least one of the second set of states; and wherein the manager module converts at least one of the second set of states of the second portion of the DFA to generate a corresponding state in the uncompressed format, deletes the at least one of the second set of states, and adds the corresponding state in the uncompressed format to the first portion of the DFA when the at least one of the second set of states is determined to include one of the counters defining one of the counts that are greater than one of the counts defined by one of the counters of the first set of states.

17. The network device of claim 15,
wherein the first portion of the hybrid DFA comprises an array portion of the hybrid DFA that includes, as the first set of states of the hybrid DFA, array states implemented in accordance with an array DFA implementation,
wherein the second portion of the hybrid DFA comprises a bitmap portion of the hybrid DFA that includes, as the second set of states of the hybrid DFA, bitmap states implemented in accordance with a bitmap DFA implementation.

18. The network device of claim 15,
wherein the control unit comprises a servicing module that includes a manager module that stores a list of pointers that reference the first set of states and the second set of states, wherein each of the pointers references a different one of the first set of states and the second set of states,
wherein the manager module further updates those of the pointers that reference the reallocated one or more of the first set of states and the one or more of the second set of states to reflect the reallocation of the reallocated one or more of the first set of states and the one or more of the second set of states between the first and second portions of the hybrid DFA.

19. The network device of claim 15,
wherein each of the first set of states and the second set of states include a counter to keep a count of the number of times each of the respective first set of states and the second set of states have been traversed,
wherein the control unit comprises a servicing engine that includes a manager module that determines the number of times the first set of states and one or more of the second sets of states have been traversed by the network device in accordance with a sampling interval, wherein the sampling interval defines a number of the packets that need be processed by the network device before updating one of the counters of the first set of states and the second set of states currently being traversed.

20. The network device of claim 19, wherein the manager module resets the counters after dynamically reallocating the one or more of the first set of states and the one or more of the second set of states between the first and second portions of the hybrid DFA based on the comparison.

21. The network device of claim 15, wherein the control unit comprises a servicing engine that includes a manager module that periodically compares the number of times one or more of the first set of states and one or more of the second sets of states have been traversed by the network device.

22. The network device of claim 15,
wherein the network device comprises an intrusion detection and prevention (IDP) device, and
wherein the control unit includes a servicing engine that that processes one or more symbols to traverse the hybrid DFA so as to detect one or more attack patterns included within the one or more packets.

23. The network device of claim 15,
wherein the network device comprises an intrusion detection and prevention (IDP) device,
wherein the control unit of the IDP device includes a servicing engine that parses the packets to identify one or more symbols within a payload of each of the packets, processes the one or more symbols to traverse the hybrid DFA so as to detect one or more attack patterns included within the one or more packets and performs a security action in response to detecting the one or more attack patterns, wherein the security action comprises one of quarantining those of the packets that include the detected attack pattern, dropping those of the packets that include the detected attack pattern, and blocking a flow associated with those of the packets that include the detected attack pattern.

24. The network device of claim 15,
wherein the first portion of the hybrid DFA comprises an array portion of the hybrid DFA that includes, as the first set of states of the hybrid DFA, array states implemented in accordance with an array DFA implementation,
wherein the control unit comprises a servicing engine that includes a manager module that stores the first data so as to define the array portion of the hybrid DFA,
wherein the second portion of the hybrid DFA comprises a bitmap portion of the hybrid DFA that includes, as the second set of states of the hybrid DFA, bitmap states implemented in accordance with a bitmap DFA implementation, and
wherein the manager module stores the second data so as to define the bitmap portion of the hybrid DFA.

25. The network device of claim 24,
wherein each of the array states comprises an array of array entries, each of the array entries corresponding to a different symbol of a plurality of symbols extracted from the packets, wherein each of the array entries store a reference to one or more of an attack signature and a next state of the hybrid DFA or indicate that no attack signature is present in one of the network packets currently being processed, and
wherein each of the bitmap states comprises a bitmap and a default state and one or more dynamically allocated unique states, wherein the bitmap comprises a number of bitmap entries that each reference either the default state or one of the one or more dynamically allocated unique states, wherein each of the default state and the one or more dynamically allocated unique states store a reference to one or more of another attack signature and another next state of the hybrid DFA or indicate that no attack signature is present in one of the network packets currently being processed.

26. A non-transitory computer-readable storage medium comprising instructions for causing a programmable processor of a network device to:
process network packets using a hybrid deterministic finite automata (DFA) having a first set of states in a first portion of the hybrid DFA in an uncompressed format and a second set of states in a second portion of the hybrid DFA in a compressed format to traverse the first set of states and the second set of states of the hybrid DFA; and
when processing the network packets, compare a number of times one or more of the first set of states and one or more of the second sets of states have been traversed by the network device and dynamically reallocate the first set of states of the first portion of the hybrid DFA in the uncompressed format and the second set of states of the second portion of the hybrid DFA in the compressed format based on the comparison by, at least in part, converting at least one of the first set of states of the first portion of the hybrid DFA to generate a corresponding state in the compressed format, converting at least one of the second set of states of the second portion of the hybrid DFA to generate a corresponding state in the uncompressed format, deleting the at least one of the first set of states, deleting the at least one of the second set of states, adding the corresponding state in the compressed format to the second portion of the hybrid DFA, and adding the corresponding state in the uncompressed format to the first portion of the hybrid DFA.

27. The non-transitory computer-readable storage medium of claim 26, further comprising instruction that cause the processor to:
   store a list of pointers that reference the first set of states and the second set of states, wherein each of the pointers references a different one of the first set of states and the second set of states; and
   update those of the pointers that reference the reallocated one or more of the first set of states and the one or more of the second set of states to reflect the reallocation of the reallocated one or more of the first set of states and the one or more of the second set of states between the first and second portions of the hybrid DFA.

28. The non-transitory computer-readable storage medium of claim 26,
   wherein the network device comprises an intrusion detection and prevention (IDP) device, and
   further comprising instruction that cause the processor to process one or more symbols to traverse the hybrid DFA so as to detect one or more attack patterns included within the one or more packets.

* * * * *